APPARATUS FOR ASSEMBLING SPOOLS

Filed Feb. 3, 1964 14 Sheets-Sheet 1

INVENTORS:
L.E. SEVISON,
BY K.L. SEVISON.
Owen & Owen
ATT'YS

INVENTORS
L. E. SEVISON,
K. L. SEVISON.
BY Owen & Owen
ATT'YS.

APPARATUS FOR ASSEMBLING SPOOLS

Filed Feb. 3, 1964 14 Sheets-Sheet 3

INVENTORS:
L.E. SEVISON,
K.L. SEVISON.
BY Owen + Owen
ATT'YS.

APPARATUS FOR ASSEMBLING SPOOLS

Filed Feb. 3, 1964

INVENTORS:
L. E. SEVISON,
BY K. L. SEVISON.
Owen & Owen
ATT'YS.

APPARATUS FOR ASSEMBLING SPOOLS

Filed Feb. 3, 1964 14 Sheets-Sheet 5

INVENTORS:
L. E. SEVISON.
BY K.L. SEVISON.
Owen & Owen
ATT'YS.

March 28, 1967 L. E. SEVISON ETAL 3,311,031

APPARATUS FOR ASSEMBLING SPOOLS

Filed Feb. 3, 1964 14 Sheets-Sheet 6

INVENTORS:
L. E. SEVISON.
BY K. L. SEVISON.
Owen & Owen
ATT'YS.

March 28, 1967 L. E. SEVISON ETAL 3,311,031

APPARATUS FOR ASSEMBLING SPOOLS

Filed Feb. 3, 1964 14 Sheets-Sheet 7

INVENTORS:
L.E. SEVISON.
K.L. SEVISON.
BY Owen + Owen
ATT'YS.

March 28, 1967 L. E. SEVISON ETAL 3,311,031

APPARATUS FOR ASSEMBLING SPOOLS

Filed Feb. 3, 1964 14 Sheets-Sheet 8

INVENTORS:
L.E. SEVISON.
BY K.L. SEVISON.
Owen + Owen
ATT'YS.

INVENTORS:
L.E. SEVISON,
K.L. SEVISON.

BY Owen & Owen

ATT'YS.

APPARATUS FOR ASSEMBLING SPOOLS

Filed Feb. 3, 1964 14 Sheets-Sheet 10

INVENTORS:
L. E. SEVISON,
K. L. SEVISON.
BY Owen & Owen
ATT'YS.

APPARATUS FOR ASSEMBLING SPOOLS

Filed Feb. 3, 1964 14 Sheets-Sheet 11

INVENTORS:
L.E. SEVISON,
BY K.L. SEVISON.
Owen & Owen
ATT'YS.

APPARATUS FOR ASSEMBLING SPOOLS

Filed Feb. 3, 1964 14 Sheets-Sheet 12

INVENTORS:
L. E. SEVISON.
K. L. SEVISON.
BY Owen & Owen
ATT'YS.

APPARATUS FOR ASSEMBLING SPOOLS

Filed Feb. 3, 1964

INVENTORS:
L.E. SEVISON.
BY K.L. SEVISON.
Owen + Owen
ATT'YS.

INVENTORS:
L. E. SEVISON,
K. L. SEVISON.
BY Owen + Owen
ATT'YS.

United States Patent Office 3,311,031
Patented Mar. 28, 1967

1

3,311,031

APPARATUS FOR ASSEMBLING SPOOLS

Luther E. Sevison and Kenneth L. Sevison, Toledo, Ohio, assignors to S. H. Davis Paper Box Company, Toledo, Ohio, a corporation of Ohio Filed Feb. 3, 1964, Ser. No. 342,296
12 Claims. (Cl. 93—1)

This invention relates to an apparatus for assembling spools, for example, cardboard of paperboard spools, each of which comprises a tubular core and a pair of head discs having a diameter slightly greater than the outside diameter of the tubular core and thus forming annular flanges at the ends of the tubular core. Spools of this type are frequently employed for packaging lengths of ribbon such as decorative packaging ribbon and similar materials. Usually the head discs are of relatively thin paperboard and the cores are short sections cut from long wrapped paperboard or cardboard tubes, the cores being slightly over 1/4", 1/2", 1", 2", etc., respectively, in axial length, depending upon the width of the particular tape or ribbon to be wrapped thereon.

Because the outer sides of the head discs are frequently utilized for carrying legends such as the name, style, type and color of the tape or ribbon, or instructions for the fashioning of various type package ties, it is essential that the head discs be applied to the cores with these printed surfaces outermost. Because it is desirable that the maximum diameter of the head discs be as small as possible relative to the particular length of ribbon packaged thereon, and because the sizes of spools of this type in commercial trade have become somewhat standardized, it is essential that the head discs be placed upon the cores as nearly perfectly concentric therewith as possible so as to align their axial holes so that they run true when placed on the mandrel of a ribbon winding machine. The spool itself has little or no value to the purchaser and, in order for a manufacturer to be competitive in the selling price of the packaged ribbon or tape, the spool must be produced at minimum cost. To these ends, methods and apparatus for assembling these spools which require manual operations are not only uneconomic, but also introduce inaccuracies in assembly which results in non-uniformity in too high a percentage of finished spools.

In the general style of commercial packages of this type, the radial thickness of the wrapped ribbon on the spool is often but a small fraction of the diameter of the head discs, for example, a 24 foot length of ribbon wrapped on a spool having a core 2 7/8" in outside diameter may be only 3/16" thick radially and head discs have only a 3 1/4" outside diameter. If the ribbon is 1/2" wide, for example, the spacing between the inner sides of the head discs, i.e., the axial width of the core, would be slightly greater, say 9/16", in order to facilitate winding the ribbon without crimping or bending its edges. However, in order to present a neat and attractive appearance, the axial length of the core and the spacing between the inner surfaces of the head discs must not be larger than the width of the ribbon by more than a very small fraction of an inch or the discrepancy in the dimension will be apparent to the eye of an observer and the package will not be as attractive. For these reasons, the annular space surrounding the outside periphery of the core and between the projecting edges of the head discs should all be available for the wrapping of the length of the ribbon to be packaged thereon. Any obstructions in this space, such as excess glue, loose portions of paper or cardboard adhered in any such excess glue, and similar flaws should be precluded. To this end, it is necessary that any apparatus of the type being discussed should have a glue applying mechanism

2 so designed as to apply a sufficient quantity of glue to the ends of the core in order to adhere the head discs thereto but should not apply an excessive quantity of glue which might string over the inner surfaces of the head discs or fill in the meeting corner between the outside surface of the core and the inside surfaces of the discs in the nature of a fillet, thereby preventing the neat and perfect wrapping of the ribbon.

It is, therefore, the principal object of the instant invention to provide an apparatus for assembling spools, each of which comprises a tubular core having an axial length falling within certain tolerances and a pair of head discs the outer surfaces of which bear advertising or other data.

It is another object of the instant invention to provide an apparatus for automatically feeding tubular cores in sequence, applying a suitable adhesive to the edges of the cores, feeding the head discs from a supply thereof and automatically positioning the head discs with their legend base bearing faces outward and on opposite sides of the cores and applying the head discs to the cores concentrically therewith to complete the assembly of the spools.

A more specific object of the instant invention is to provide apparatus for assembling spools comprising an improved header mechanism actuated in timed relationship to the feeding of the cores and having means for selecting individual head discs for each side of each core, positioning them concentrically with the cores as it arrives at the header, and firmly applying the head discs to the opposite edges of the core.

Other and more specific objects and advantages of an apparatus embodying the instant invention will be better understood from the specification which follows and from the drawings in which.

Figures 1, 2:
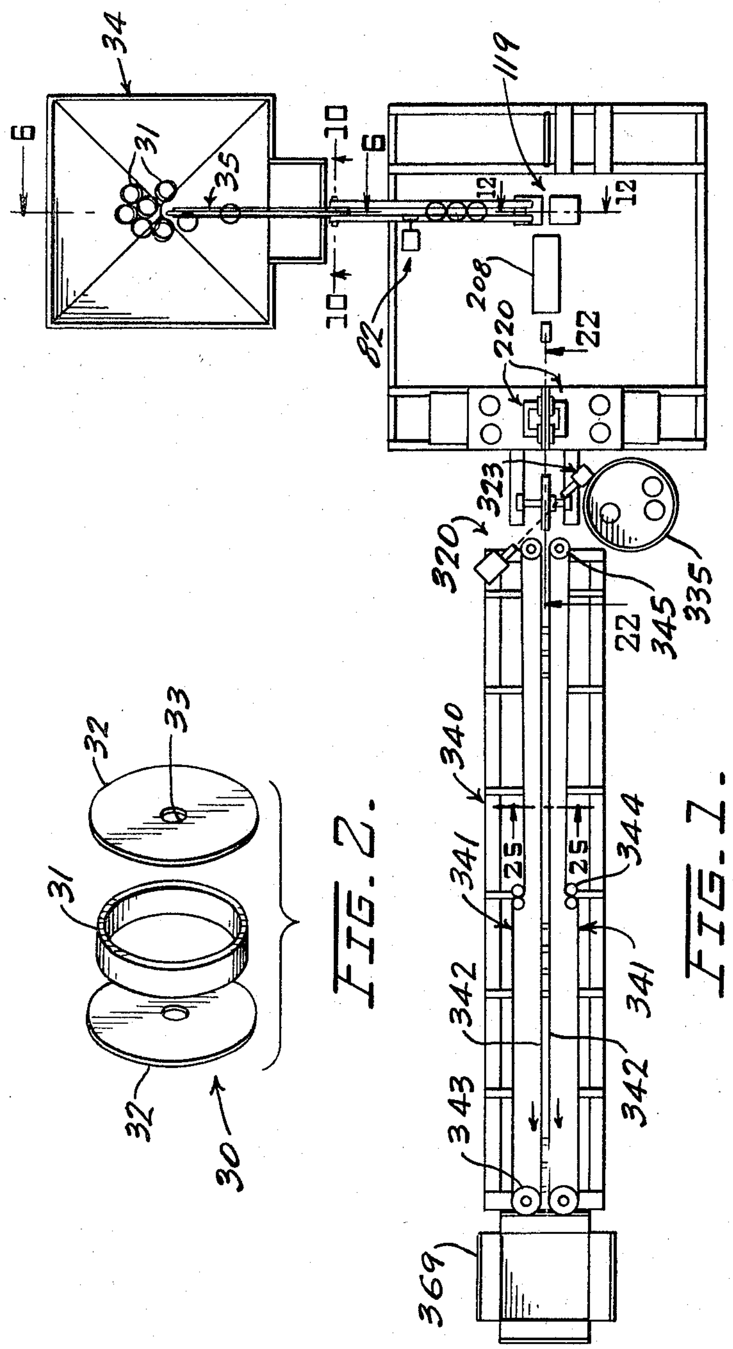
FIG. 1 is a simplified plan view of an apparatus embodying the invention, being shown on a small scale and serving, primarily, to orient the various subassemblies of such apparatus with respect to each other.
FIG. 2 is an exploded view on a greatly enlarged scale of a spool of the type which is assembled on an apparatus according to the invention.
Figures 3, 4:
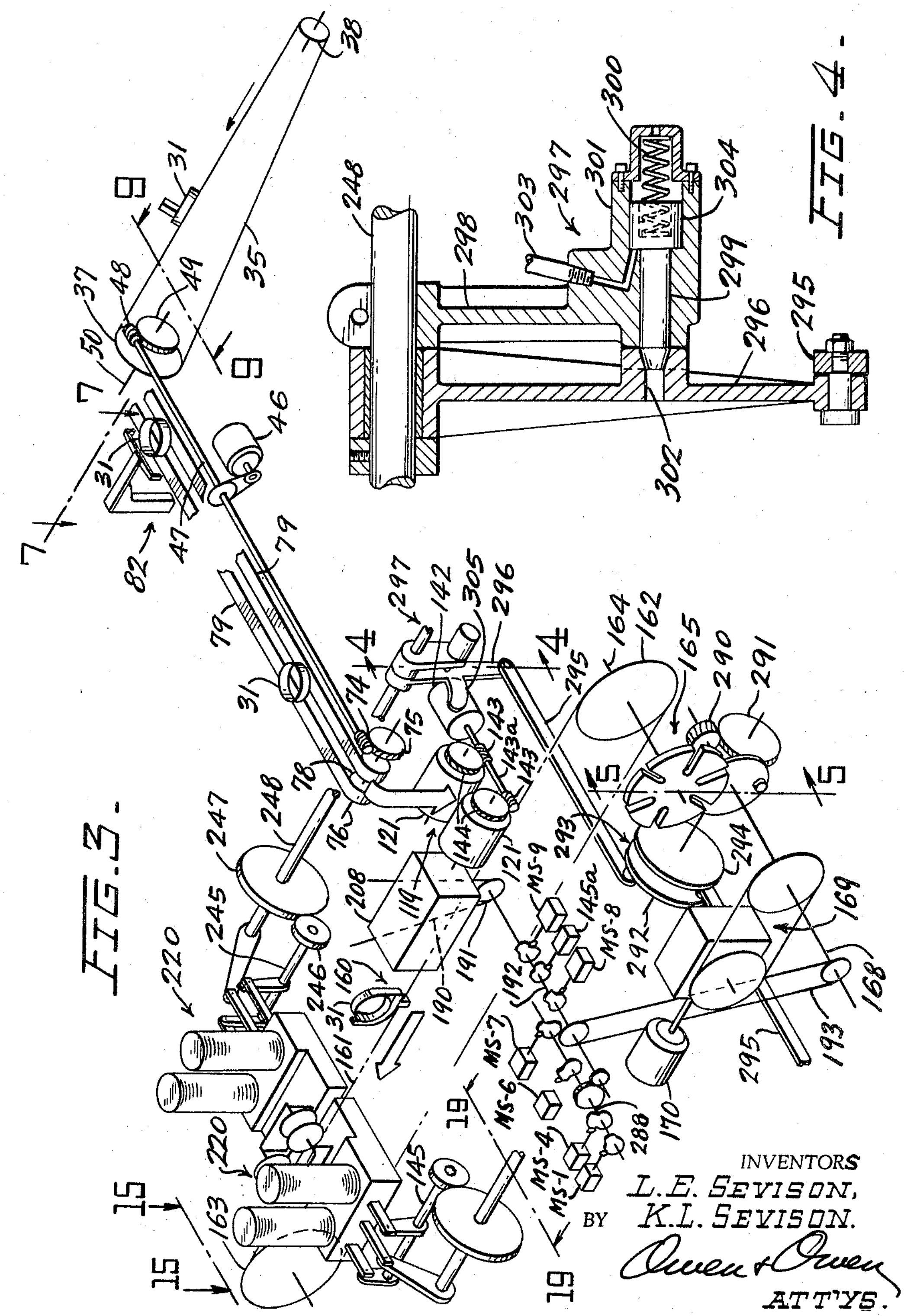
FIG. 3 is a schematic view in perspective, with parts broken away and parts being only generally indicated, illustrating the principal components of the apparatus and the mechanism for driving the same.
FIG. 4 is a fragmentary vertical sectional view taken along the line 4—4 of FIG. 3 and shown on an enlarged scale.
Figures 5, 6, 25:
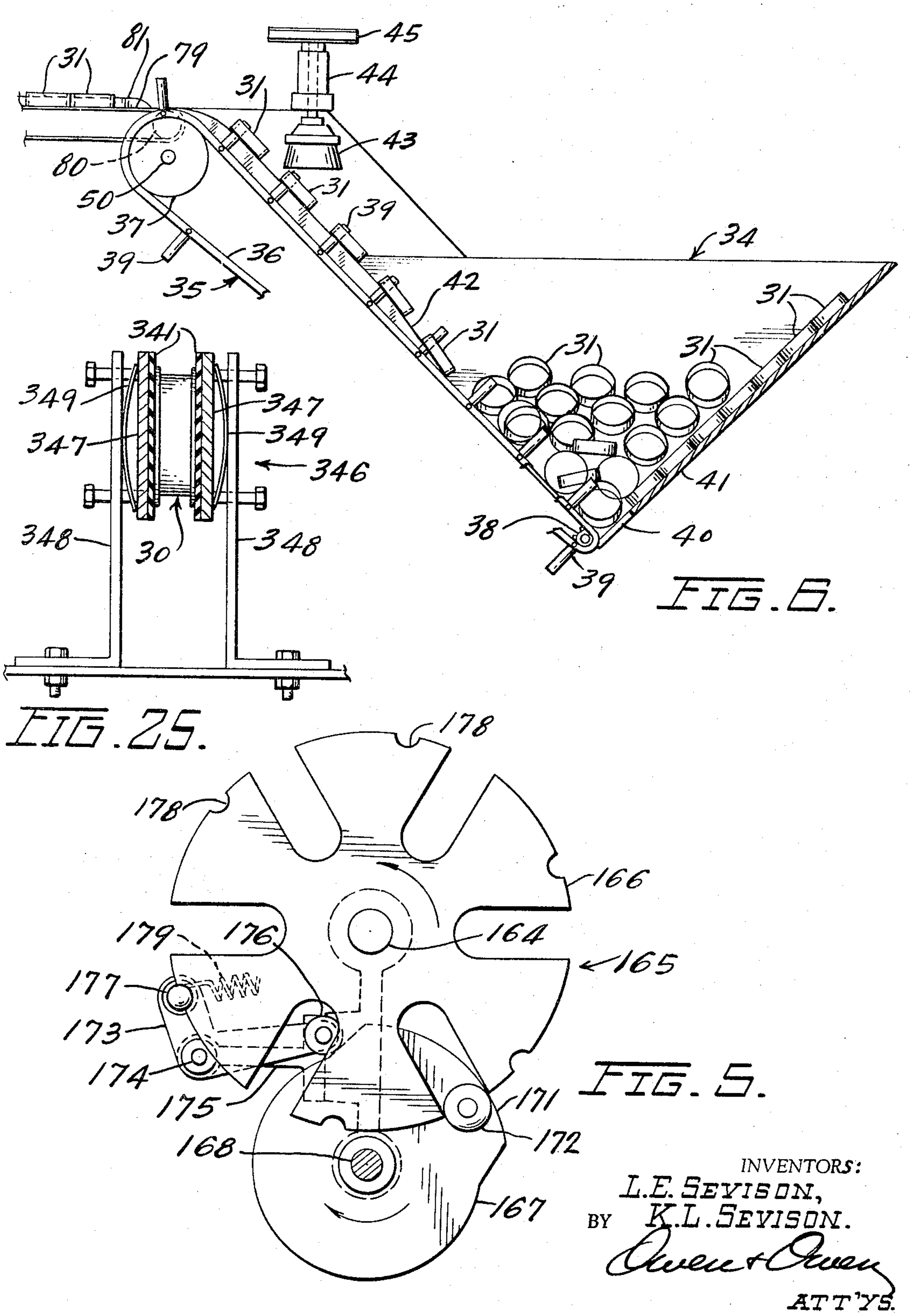
FIG. 5 is a detailed view of a main element of the drive mechanism taken from the position indicated by the line 5—5 of FIG. 3 and shown on an enlarged scale.
FIG. 6 is a fragmentary vertical sectional view taken along the line 6—6 of FIG. 1 and illustrating the mechanism for selecting and feeding cores, being shown on an enlarged scale relative to FIG. 1.
Figures 14, 14A:
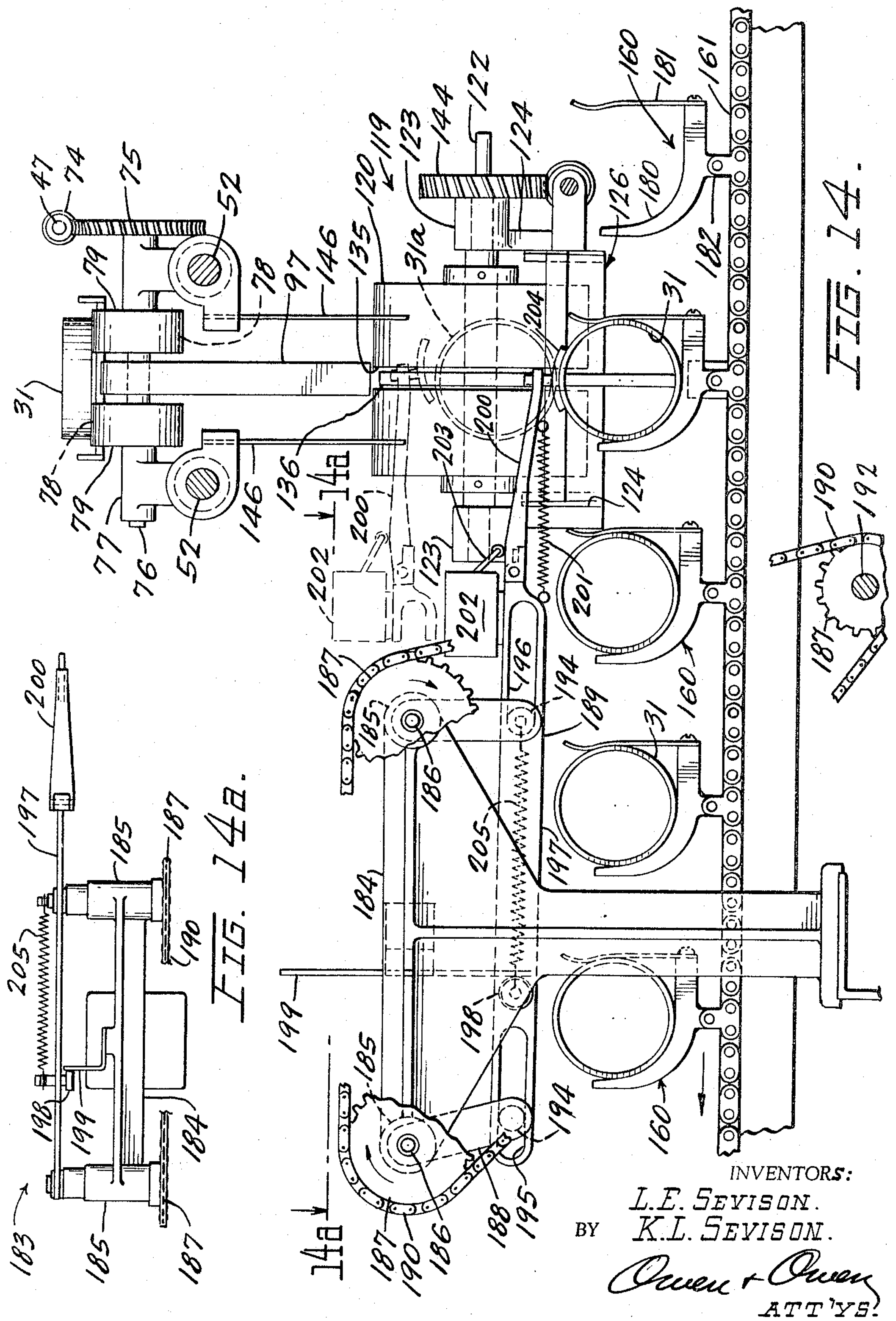
FIG. 14 is a fragmentary view primarily in elevation, taken along the line 14—14 of FIG. 12 and shown on a slightly reduced scale.
Figure 15:
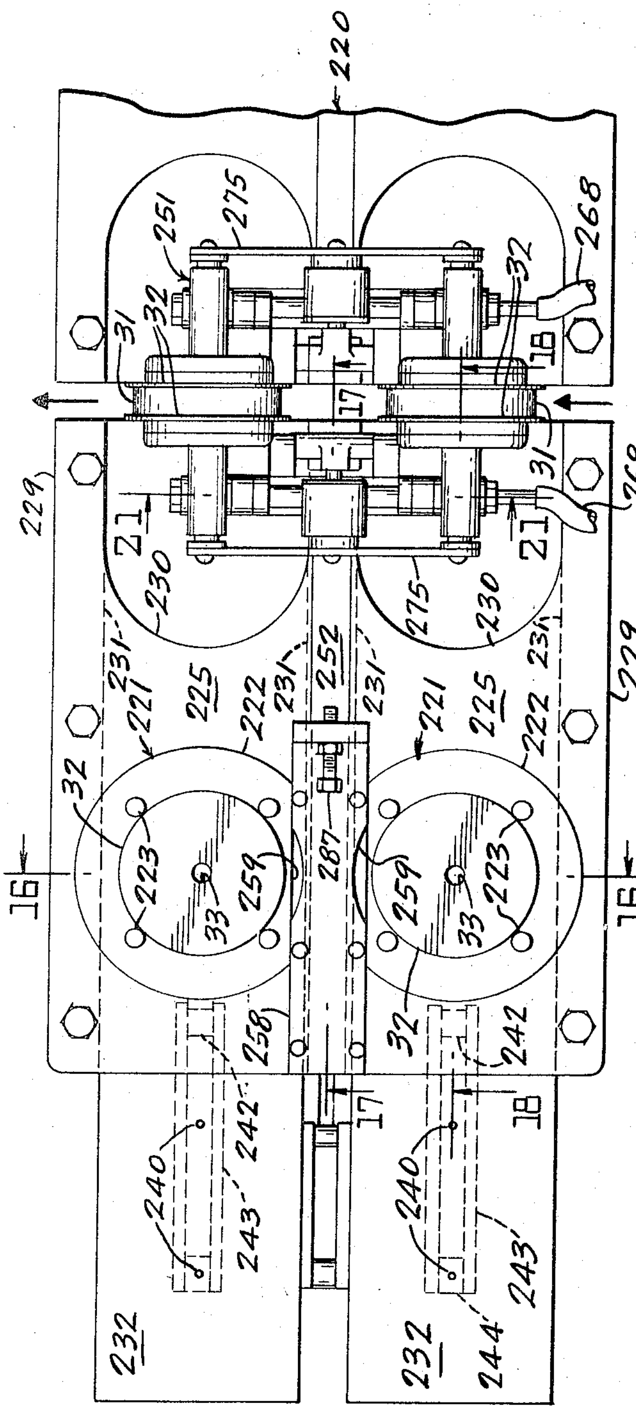
Figure 16:
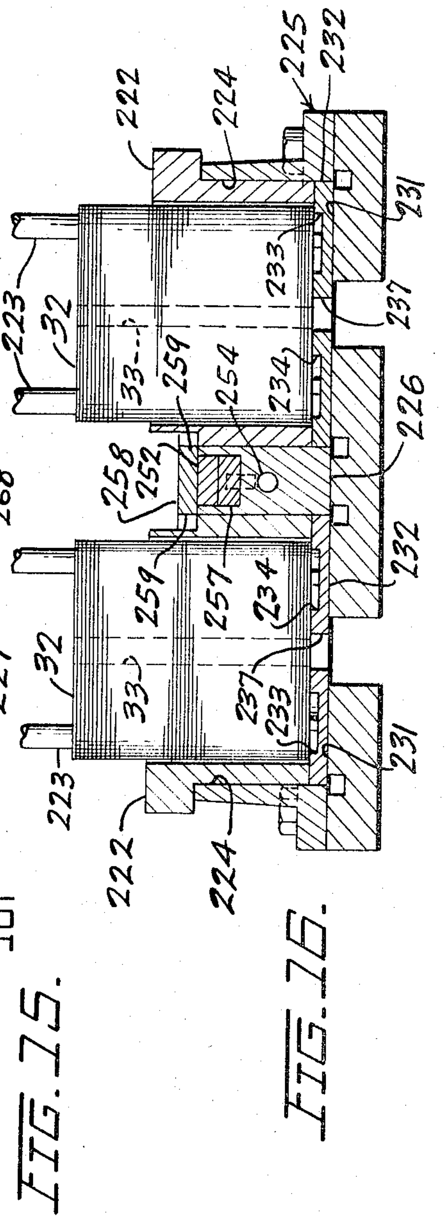
Figure 17:
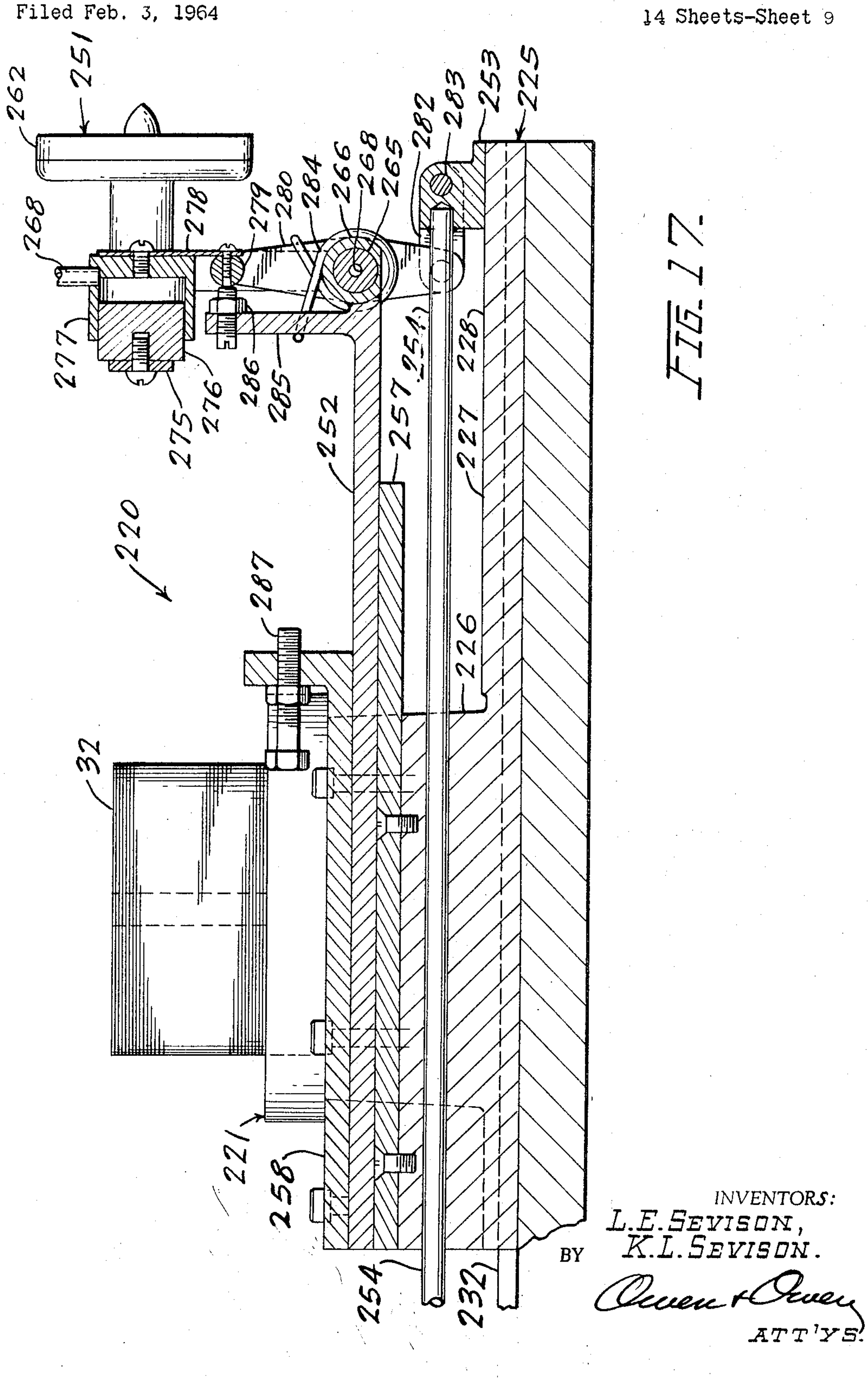
Figure 1B:
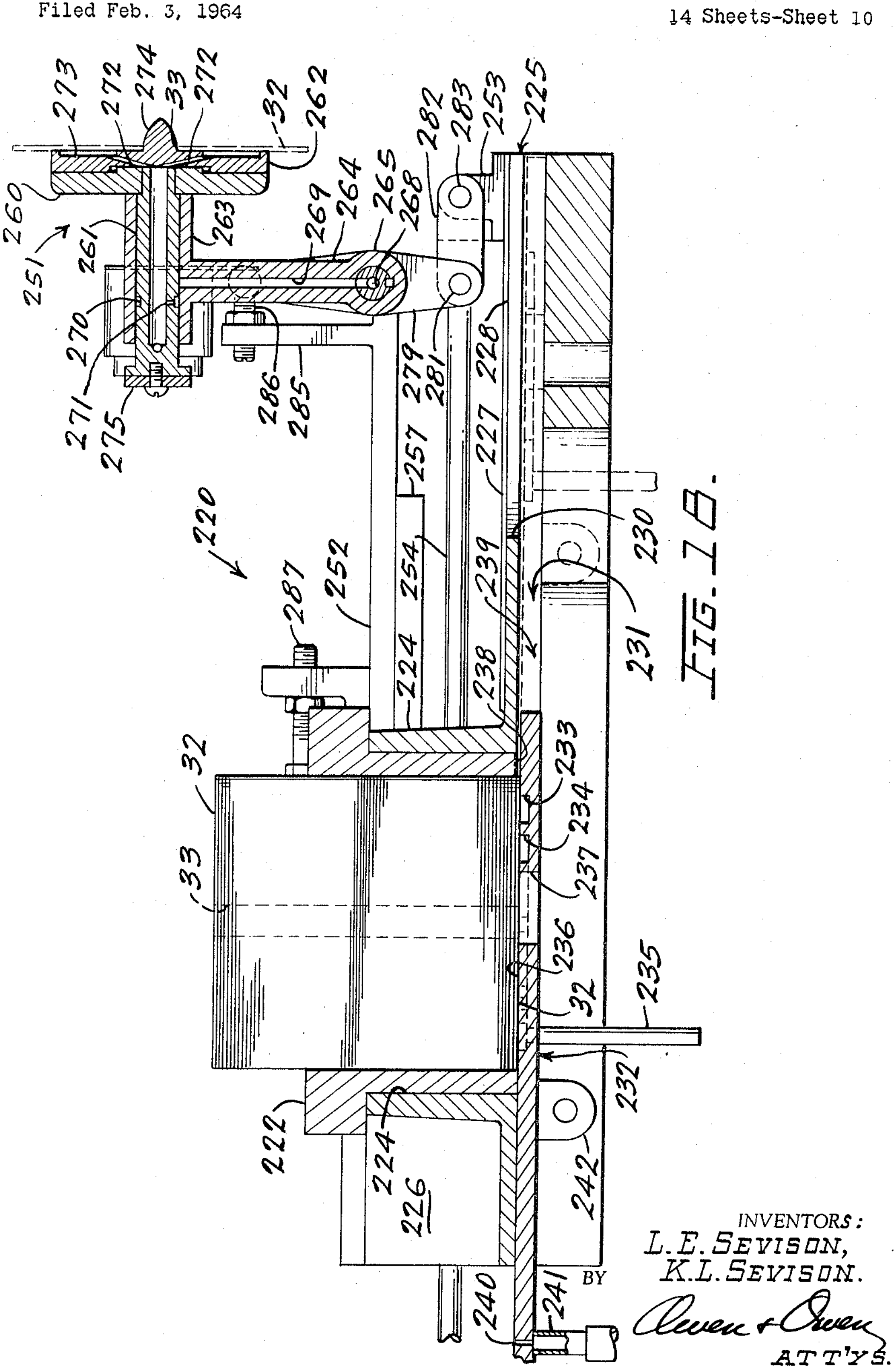
Figures 19, 20:
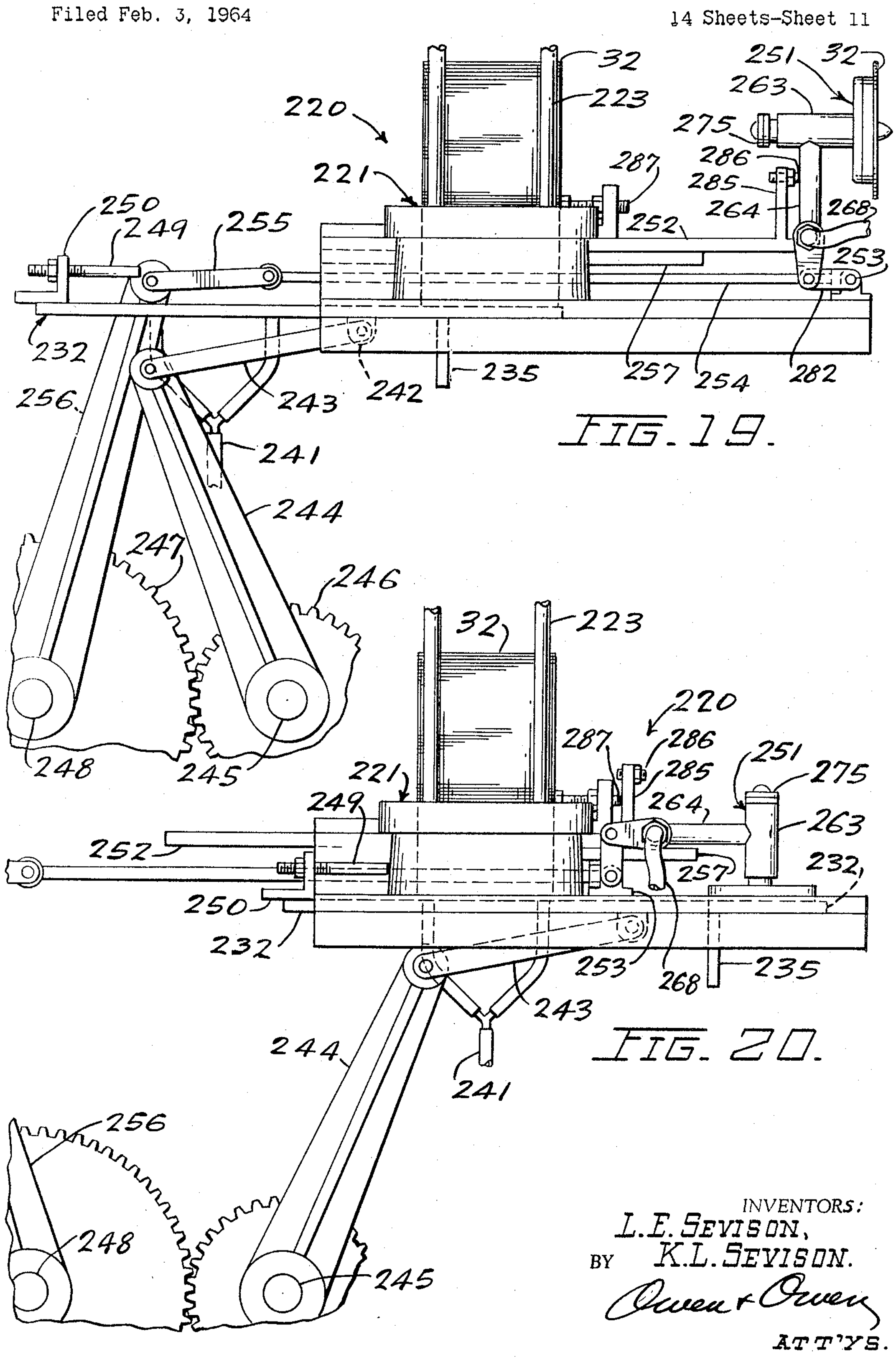
Figures 21, 22:
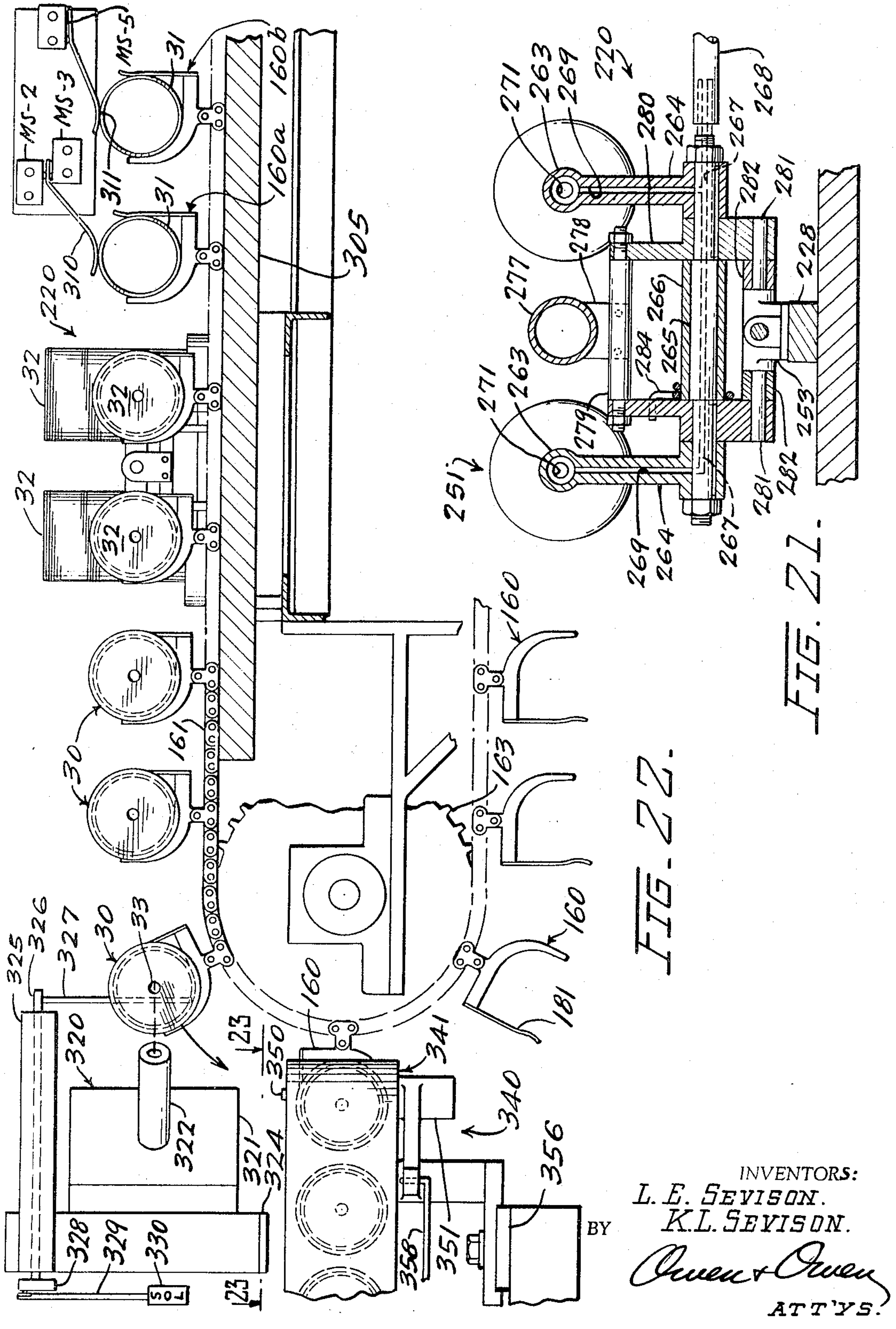
Figure 23:
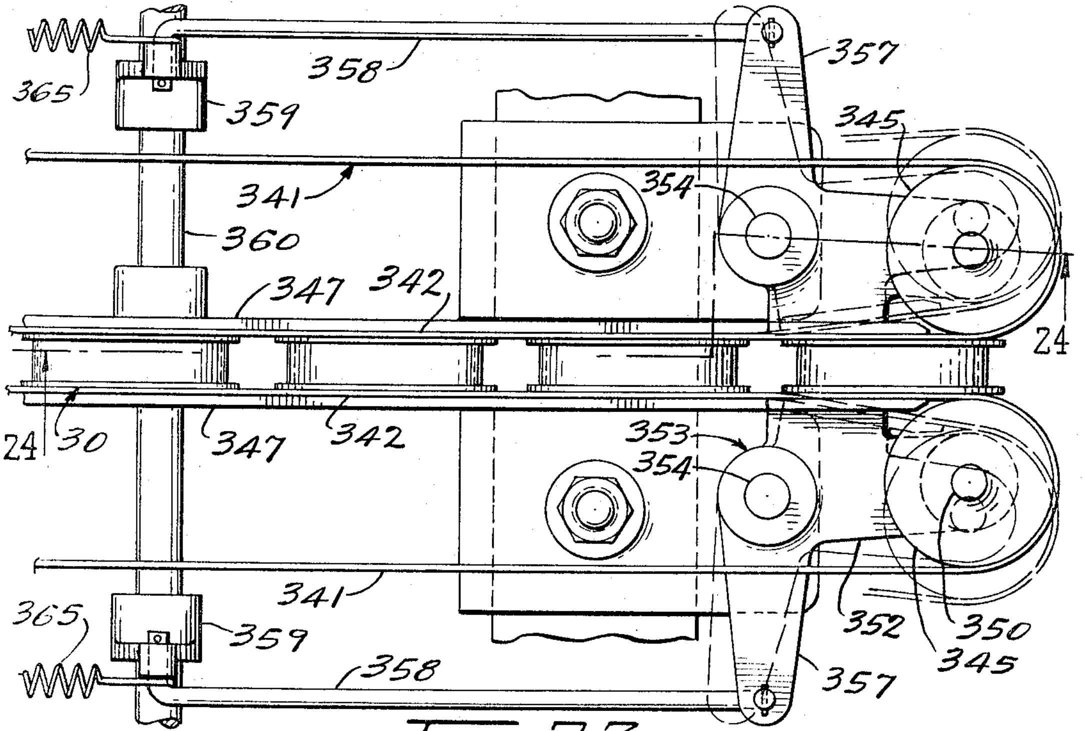
Figure 24:
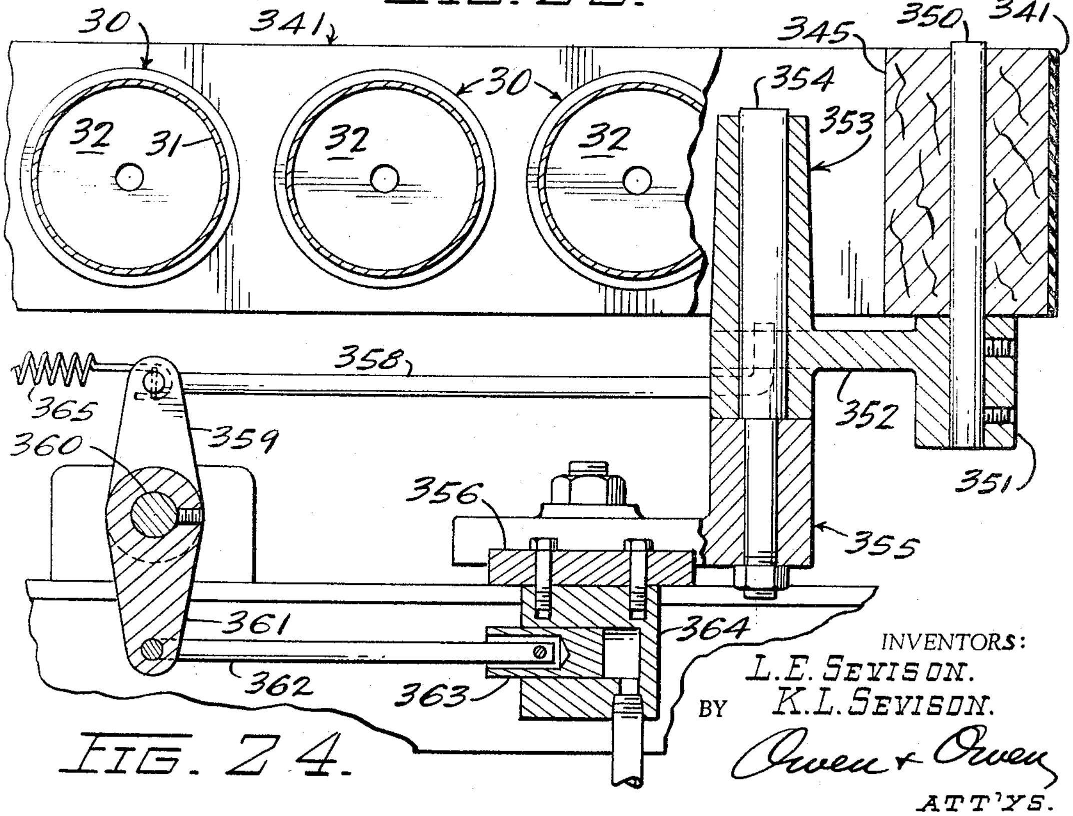
Figure 26:
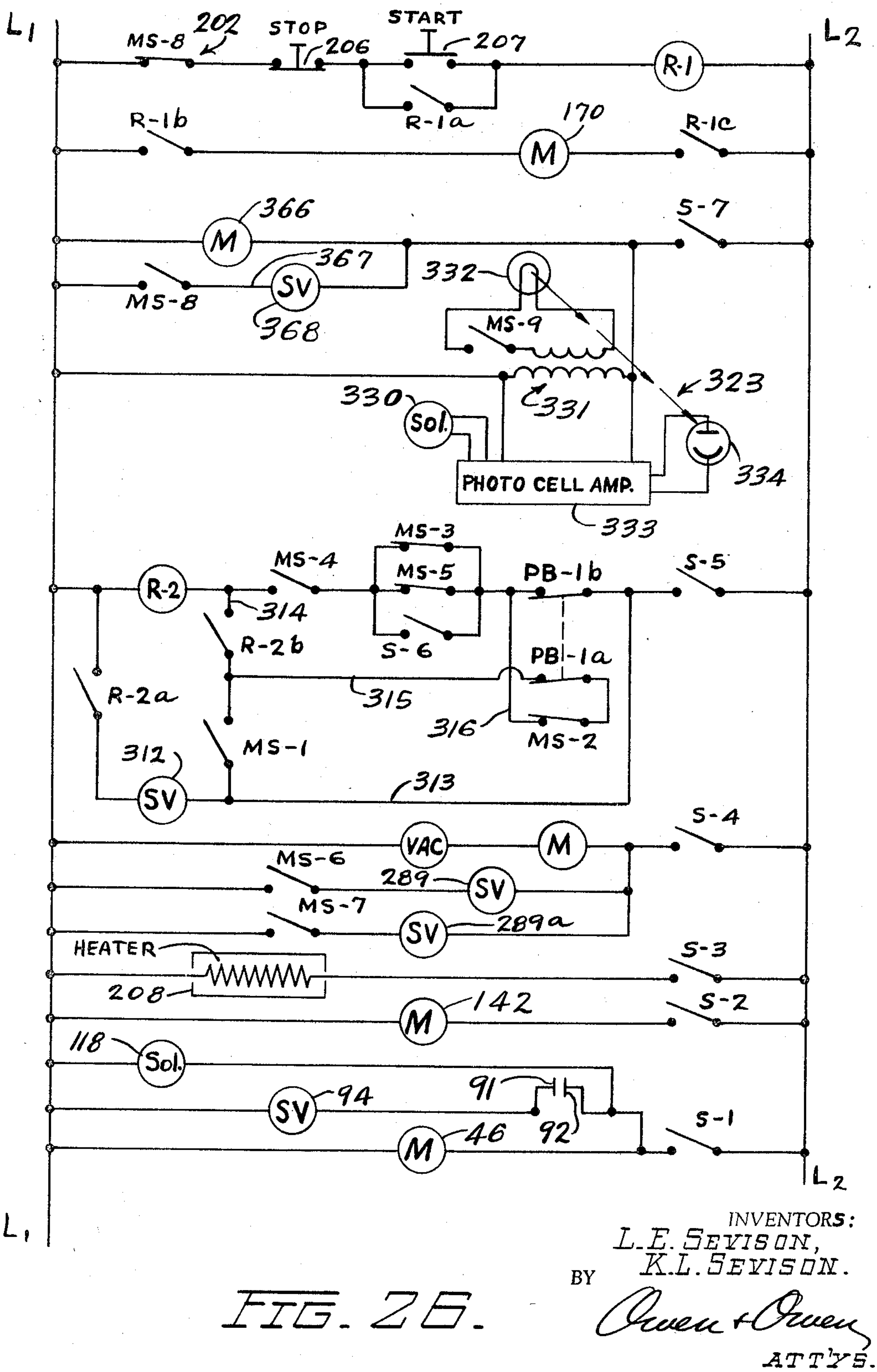

FIG. 14*a* is a fragmentary detailed plan view taken approximately from the position indicated by the line **14*a*—14*a*** of FIG. 14;

FIG. 15 is a top plan view of a header mechanism for applying head discs to the cores delivered thereto, being taken generally from the position indicated by the line 15—15 in FIG. 3 and shown on an enlarged scale relative thereto;

FIG. 16 is a fragmentary vertical sectional view taken along the line 16—16 of FIG. 15, being shown on a slightly enlarged scale relative to FIG. 15;

FIG. 17 is a fragmentary vertical sectional view taken along the line 17—17 of FIG. 15 and being shown on an enlarged scale;

FIG. 18 is a fragmentary vertical sectional view taken along the line 18—18 of FIG. 15, being shown on the same scale as FIG. 37;

FIG. 19 is a fragmentary vertical sectional view taken along the line 19—19 of FIG. 3 and illustrating, primarily, the drive connections for the header mechanism illustrated in FIGS. 17 and 18;

FIG. 20 is a view similar to FIG. 19 but showing the operating parts in a different position;

FIG. 21 is a fragmentary vertical sectional view taken along the line 21—21 of FIG. 15;

FIG. 22 is a fragmentary view, partly in section and partly in elevation, taken along the line 22—22 of FIG. 1 and shown on a greatly enlarged scale;

FIG. 23 is a fragmentary top plan view taken generally from the line 23—23 of FIG. 22 and shown on an enlarged scale relative to FIG. 22;

FIG. 24 is a fragmentary vertical sectional view taken along the line 24—24 of FIG. 23;

FIG. 25 is a fragmentary, detailed vertical sectional view taken along the line 25—25 of FIG. 1, being shown on a greatly enlarged scale relative thereto; and FIG. 26 is a schematic wiring diagram illustrating the vertical controls for an apparatus embodying the invention.

In FIG. 1 of the drawings there is shown in simplified plan view all of the cooperating subassemblies and mechanisms forming an apparatus according to the invention for the purpose of assembling spools, one of which is shown in FIG. 2. A ribbon spool generally indicated by the reference number 30 comprises a tubular core 31 and a pair of head discs 32. The core 31 usually is cut from a length of tubular paperboard stock, the axial dimension thereof being selected to be slightly greater than the width of the ribbon or tape to be packaged thereon. The head discs 32 are die-cut or otherwise formed from sheets of relatively thin paperboard, say in the order of .025" to .035" and have central locating holes 33. The faces of the discs 32 which are to be at the outer side of the finished spool 30 usually are printed with trademarks, manufacturer's name, dimension and length of the tape, instructions for the assembly of packages and other legends and information. When printed discs are used, it is essential that any apparatus for assembling the spools 30 be capable of handling the head discs 32 so as to assemble them with the cores 31 with the printed faces of the discs 32 turned outwardly.

In an apparatus according to the invention, mechanism is provided for selecting cores 31 from a supply thereof and for serially feeding these cores to a glue applying mechanism. The glue applying mechanism spreads a thin coating of glue over the end surfaces of the cores 31 and then feeds the glued cores 31 to a header station where the head discs 32 are selected from supply stacks, positioned concentrically with the cores 31 and pressed in place. The apparatus also comprises a drying conveyor which carries the assembled spools 30 for a period of time long enough to permit the glue on the end surfaces to dry, simultaneously maintaining pressure against the discs 32 to hold them tightly in contact with the cores 31 while the glue dries.

*Core supply*

In the illustrated embodiment of the invention the cores 31 are automatically supplied from a hopper 34 (see also FIG. 6) illustrated as having a rectangular plan view and an inverted pyramidal shape. A supply of cores 31 is dumped into the hopper 34 and the cores 31 are serially fed out of the hopper 34 by a hopper conveyor generally indicated by the reference number 35. The hopper conveyor 35 comprises a chain 36 which is stretched around a drive sprocket 37 at the upper end and a smaller idler sprocket 38 located at the bottom of the hopper 34. The chain 36 carries a plurality of spaced fingers 39 each of which is of such length and so spaced from its neighbors as to engage a single one of the cores 31 and carry it up out of the hopper 34. The chain 36 enters the hopper 34 through a slot 40 cut in a lower wall 41 of the hopper 34 with the fingers 39 being turned upright as they enter the hopper 34. Having engaged one of the cores 31, a finger 39 pulls that core 31 upwardly and onto a tapered ramp 42 which comprises a pair of laterally spaced bars between which the fingers 39 are led. The vertical height of the ramp 42 is such that as the cores 31 are slid upwardly thereon, they approach the ends of the fingers 39, thus reducing the chances that a second core 31 may be engaged by any particular finger 39 and carried along on top of a lower core 31. In order to preclude the delivery of two cores by any one of the fingers 39, a vertically adjustable brush 43 may be positioned near the upper end of the hopper conveyor 35 as illustrated in FIG. 6. The brush 43 is illustrated as being mounted on the lower end of a spindle 44 rotated by a motor driven belt 45 so as to brush superposed cores 31 off of the fingers 39.

Figures 9, 10, 11, 13:
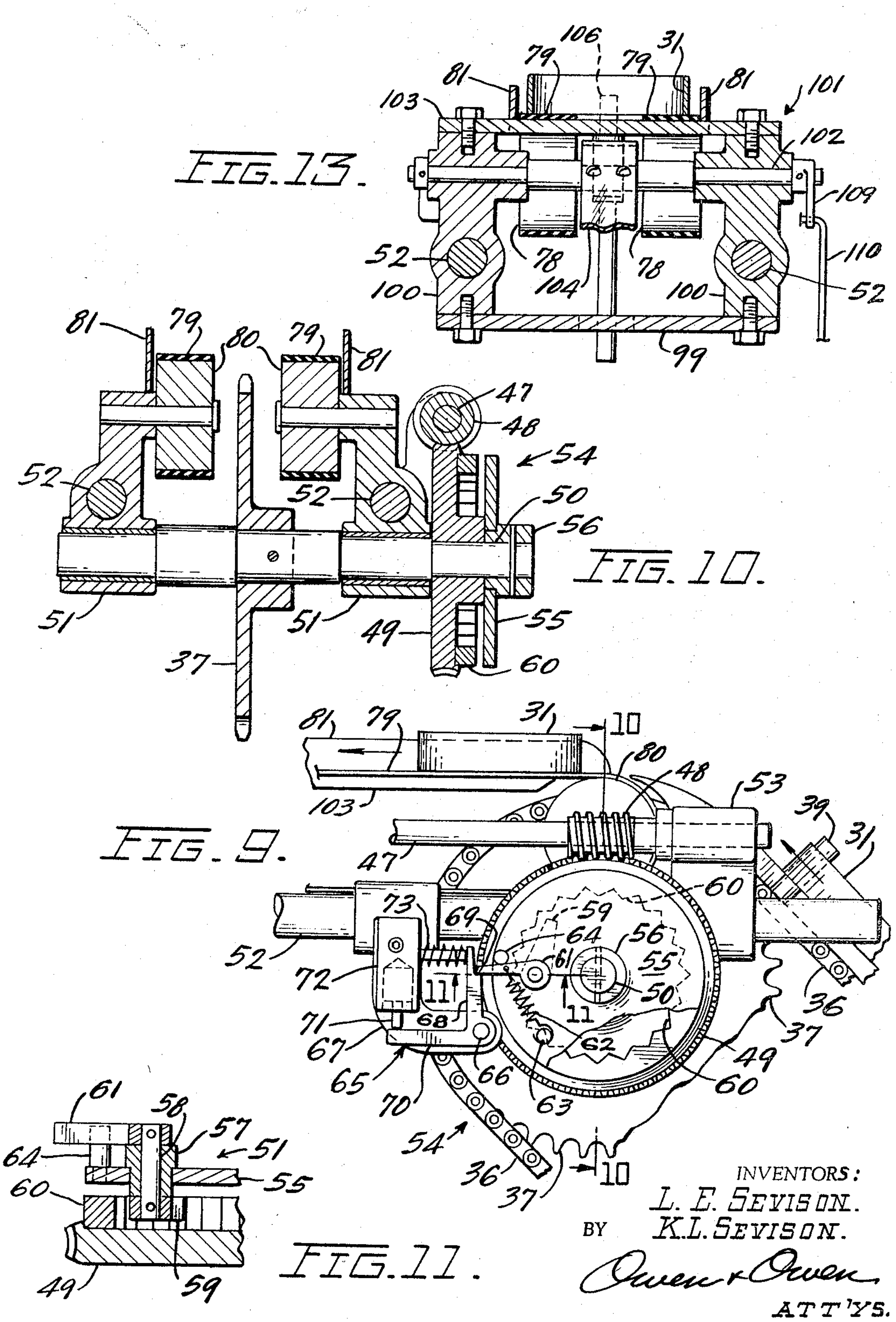
FIG. 9 is a fragmentary, detailed view partly in elevation, showing a clutch mechanism for driving the spool feeding belt illustrated in FIG. 6, taken from the position by the line 9—9 of FIG. 3 and shown on a greatly enlarged scale.
FIG. 10 is a fragmentary vertical sectional view taken along the line 10—10 of FIG. 9.
FIG. 11 is a fragmentary horizontal sectional view taken along the line 11—11 of FIG. 9.
FIG. 13 is a fragmentary vertical sectional view taken along the line 13—13 of FIG. 12.

The hopper conveyor 35 is driven by a core feeding device mechanism a motor 46 (FIG. 3) and a drive shaft 47. The drive shaft 47 has a worm 48 at its rear end (right end in FIG. 3) which is meshed with a worm gear 49. The worm gear 49 is rotatably mounted on a cross shaft 50 which is journaled in a pair of bosses 51 depending from two longitudinal support rods 52. The drive shaft 47 is supported by an upright 53 (FIG. 9) which is mounted on one of the support rods 52.

The drive sprocket 37 for the hopper conveyor 35 is pinned on the cross shaft 50 (see FIG. 10) and power is delivered from the worm gear 49 to the sprocket 37 through a clutch generally indicated by the reference number 54. The clutch 54 comprises a plate 55 mounted by a hub 56 pinned or otherwise secured on the end of the shaft 50 for rotation therewith. The plate 55 mounts a tubular bushing 57 (FIG. 11) through which there extends a pawl pin 58. A drive pawl 59 is fixed on the inner end of the pin 58 and engageable with the teeth on the inner periphery of an annular ratchet gear 60 which is carried by and rotatable with the worm gear 49. A release pawl 61 is secured on the outer end of the pin 58. A tension spring 62 is connected between the release pawl 61 and a pin 63 studded into the side of the plate 55. The spring 62 urges the pawls 61 and 59 in a counterclockwise direction (FIG. 9), tending to engage the drive pawl 59 in the teeth of the ratchet gear 60. A stop 64 is also studded in the outer face of the plate 55 in line to be engaged by the back side of the outer pawl 61 in stop position.

An angular catch 65 is pivotally mounted by a pin 66 on a bracket 67 depending from one of the support rods 52. The catch 65 has an upwardly extending arm 68 in which is cut a shoulder 69 adapted to be and shown as engaged by the end of the release pawl 61 in FIG. 9 which causes the pawls 61 and 59 to be rotated slightly in a clockwise directed (FIG. 9) to disengage the end of the drive pawl 59 from the teeth on the annular ratchet gear 60. A second, horizontally extending arm 70 of the catch 65 is located beneath a plunger 71 of an air cylinder 72, that is also mounted on the bracket 67. An expansion spring 73 extends between the side of the air cylinder 72 and the back side of the upper arm 68 of the catch 65. The spring 72 urges the catch 65 in a clockwise direction to effect engagement with the release pawl 61. When air is applied to the cylinder 72, its plunger 67 is extended to pivot the catch 65 in a counterclockwise direction releasing the end of the pawl 61 and allowing the tension spring 62 to swing the drive pawl 59 to engage the clutch for delivering power from the worm gear 49 to the sprocket 37 and thus driving the hopper conveyor 35.

The front end of the shaft 47 (left end in FIG. 3; see also FIG. 14) carries a worm 74 which is engaged with a worm gear 75 mounted on the end of a second cross shaft 76 that is journaled in a pair of transversely aligned bearings (see also FIG. 12) which are supported by the two support rods 52. The cross shaft 76 mounts a pair of horizontally spaced drive pulleys 78 which support and power two laterally spaced, horizontally extending, conveyor belts 79. The rear ends of the two conveyor belts 79 are engaged over a pair of idler pulleys 80 (see FIG. 10) located at the upper end of the hopper conveyor 35 (see FIG. 9). The core conveyor comprising the two belts 79 is continuously driven by the motor 46 in order to feed cores 31 to the following structures of the apparatus. As can best be seen by reference to FIGS. 9 and 10, because the sprocket 37 extends upwardly between the conveyor belts 79, when a core 31 is carried to the top of the hopper conveyor 35, it is fed upwardly and onto the core conveyor belts 79 just above the idler pulleys 80. The belts 79 of the core conveyor are flanked along their lengths by side guides 81.

Figure 7:
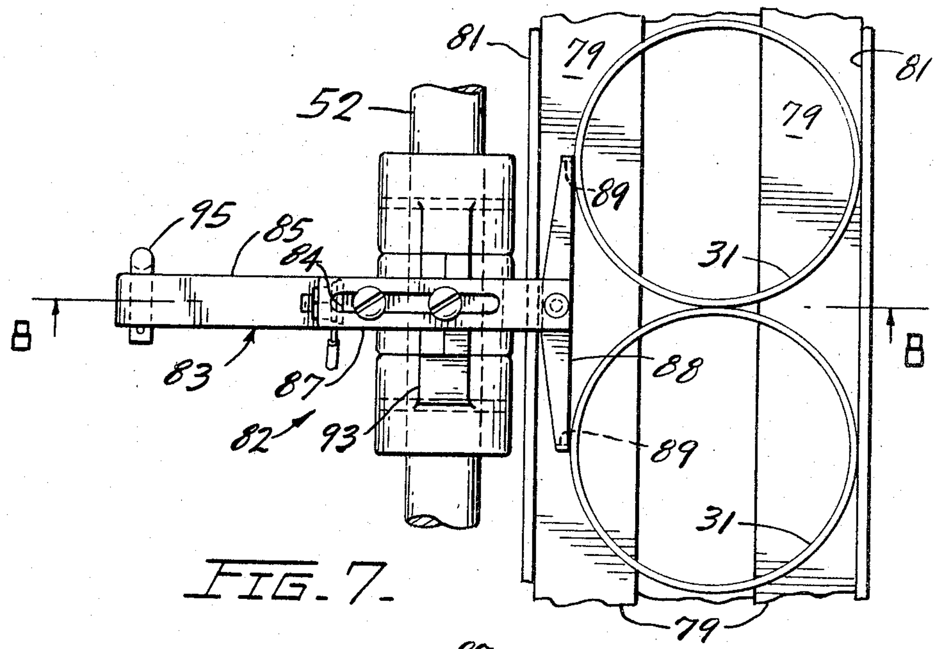
FIG. 7 is a fragmentary, detailed plan view taken along line 7—7 of FIG. 3 and illustrating a portion of the core feeding conveyor of an apparatus, being shown at a greatly enlarged scale relative to FIG. 2 or 3.
Figure 8:
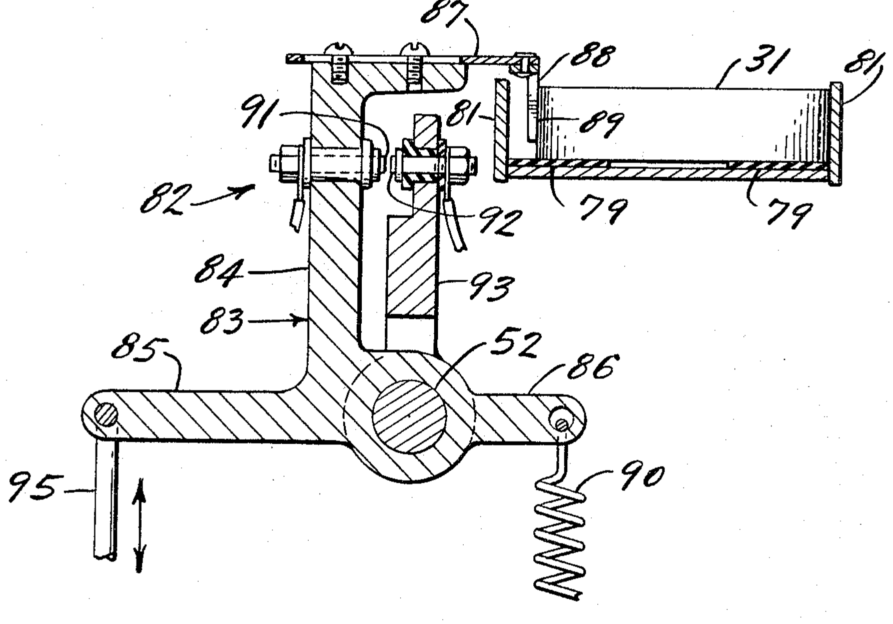
FIG. 8 is a fragmentary vertical sectional view taken along the line 8—8 of FIG. 7.

Even though the core conveyor belts 79 are continuously moving, the actual feeding of the cores 31 to the next assembly of the apparatus, is controlled by two mechanisms. The first of these senses whether or not the core conveyor comprising the belts 79 is fully loaded with cores 31 throughout its length and the second mechanism functions to release successive cores 31 from the front end of the core conveyor belts 79 to be fed through the next mechanism in timed sequence to the operation of the remainder of the machine. The first of these mechanisms, i.e., the core supply sensing means is illustrated in FIGS. 7 and 8, and is located adjacent the core conveyor belts 79, being generally indicated by the reference number 82 in FIG. 3. The sensing mechanism 82 comprises a rocker 83 mounted on one of the longitudinal support rods 52 and having an upright arm 84 and a pair of oppositely extending horizontal arms 85 and 86. The upright arm 84 mounts a slotted slide 87 on its upper end, the slide 87 extending transversely over the adjacent one of the side guides 81 and overhanging the adjacent one of the core conveyor belts 79. A longitudinally elongated feeler 88, having two depending fingers 89, is mounted on the inner end of the slide 87. The two fingers 89 are spaced from each other longitudinally of the core conveyor belts 79 a distance substantially equal to the diameter of the cores 31. The rocker 83 is urged in a clockwise direction (FIG. 8) by a tension spring 90, but engagement of the fingers 89 with the cores 31 and of those cores 31 with the other side guide 81, prevents the rocker 83 from moving beyond the position indicated in FIG. 8.

The upright arm 84 of the rocker 83 also carries a contact 91 which is aligned for engagement with a second contact 92 supported by an arm 93 fixed on the support rod 52. The two contacts 91 and 92 control a branch electrical circuit (see FIG. 26 near the bottom thereof) leading to a solenoid valve 94 which controls the feed of air to the air cylinder 72 (FIG. 9) which actuates the clutch 54 for the hopper conveyor 35. As long as there are cores 31 present at the core sensing mechanism 82, the contacts 91 and 92 are maintained out of contact and the solenoid valve 94 is de-energized and therefore no air supplied to the cylinder 72 so the clutch 54 is held in non-driving position. When the core conveyor belts 79 have fed the cores 31 away from the mechanism 82, the spring 90 urges the rocker 83 in a clockwise direction (FIG. 8) closing the contacts 91 and 92 and energizing the solenoid valve 94 to supply air to the cylinder 72. This removes the arm 68 from the path of the clutch pawl 61 allowing the clutch 54 to engage and drive the hopper conveyor 35 to supply additional cores to the feed arm end of the core conveyor belts 79.

The arm 85 of the rocker 83 is connected by a vertical pull rod 95 (FIGS. 7 and 8) to an oscillatory shaft which extends across the machine beneath the level of the core conveyor belts 79 and is driven by a main power transmission to be described below. Vertical reciprocation of the pull rod 95 oscillates the rocker 83 repeatedly in order to open the space between the fingers 89 and the opposed side guide 81 so as to allow cores to move into that space in the event that additional cores are being supplied to the core conveyor belts 79. Were it not for the intermittent rocking of the rocker 83, the absence of cores 31 at this point would allow the rocker 83 to be swung in a clockwise direction to close the contacts 91 and 92 a distance such that the movement of a subsequent core 31 into the space between the fingers 89 and the opposed side guide 81 would be impossible.

At the off bearing ends of the core conveyor belts 79 (FIGS. 12 and 13) each of the side guides 81 mounts a downwardly curving guide wire 96 (FIG. 12) and a curved guide plate 97 is supported by an arm 98, the plate 97 extending upwardly into the space between the two drive pulleys 78 for the belts 79. The arm 98 is secured to a plate 99 bolted to the underside of a pair of brackets 100, the brackets 100 being carried by the two longitudinally extending support rods 52. The foremost core 31 on the core conveyor belts 79 is released to be carried forwardly between the guide wires 96 and to slide down the arcuate guide plate 97 by a core release mechanism generally indicated by the reference number 101 and shown in detail in FIGS. 12 and 13.

The core release mechanism 101 comprises a rocking shaft 102 extending transversely beneath the two belts 79 and pivotally mounted in aligned bearings at the upper ends of the brackets 100. The upper ends of the brackets 100 are connected by and support a baseplate 103 on which the belts 79 slide and which also functions to support the forward ends of the side guides 81. A generally horizontal butterfly actuator 104 is screwed to a flat that is milled in the shaft 102 at its midpoint. The ends of the actuator 104 are engageable with the vertically spaced arms of C-sections 105 of a pair of vertically extending, reciprocal pins 106. The pins 106 are guided by pairs of vertically aligned holes in the plates 103 and 99, respectively, for vertical movement to uppermost positions in which they protrude between and above the conveyor belts 79. Springs 107 that are compressed between the upper surface of the lower plate 99 and washers 108 located beneath the C-sections 105 of the pins 106 urge the pins 106 upwardly. The rocker shaft 102 has a crank arm 109 (FIG. 13) pinned or otherwise secured to one of its ends. The crank arm 109 is connected by a vertical link 110 to a crank on a lower shaft that is driven by the main power transmission to be later described.

The rocker shaft 102 is oscillated in timed relation to the operation of other subassemblies of the apparatus, swinging the butterfly actuator 104 back and forth and alternately protruding the two pins 106 upwardly above the level of the core conveyor belts 79. The foremost pin 106 is shown in protruding position in FIG. 12 and as holding back the foremost one of the cores 31. Upon the next rocking movement of the butterfly actuator 104 (counterclockwise in FIG. 12) the other pin 106 will be allowed to move upwardly by expansion of its spring 107 and, after a short delay resulting from the gap between the arms of the C-section 105, the left end of actuator 104 will pull the foremost pin 106 downwardly beneath the level of the top surface of the conveyor belts 79 allowing these belts to feed the foremost core 31 onto the downwardly curved arcuate guide plate 97.

The lower portion of the arcuate guide plate 97 is spaced from a vertically extending guide plate 111 (FIG. 12), the two plates 97 and 111 forming a vertically extending chute through which each core 31 moves downwardly. At the throat between the guide plates 97 and 111 there is provided a core catch 112 which comprises a post 113 mounted on the outer side of the plate 111, a lever 114, a pin 115 which is slidable through an opening 116 in the plate 111, and a spring 117 urging the pin 115 through the hole 116 and into the throat between the plates 97 and 111. A solenoid 118 is connected to the lever 114, the solenoid 118 holding the lever 114 in the position shown in FIG. 12 when it is energized.

The core catch solenoid 118 is electrically connected in the core feeder apparatus wiring circuit shown near the bottom of FIG. 26. The entire core feeder apparatus is controlled by a core feeder switch "S–1" by which a circuit is established between power lines $L_1$ and $L_2$ to energize the core feeder motor 46. This also establishes a circuit leading through the core sensing contacts 91 and 92 and to the solenoid valve 94 of the hopper conveyor clutch 54. A branch circuit, parallel with the circuit of the contacts 91 and 92 and solenoid valve 94 leads to the core catch solenoid 118 and thence to the main line $L_1$. When the core feeder control switch S–1 is closed, the core feeder motor 46 is energized, the circuit is established for the hopper conveyor clutch 54 and the core catch solenoid 118 is energized to keep its stop pin 115 out of the throat between the guide plates 97 and 111 so that cores can pass through that throat. Whenever the operator desires to stop feeding cores 31, or in the event of a jam in the subsequent portions of the apparatus, the operator opens the switch S–1 which not only shuts off the core feeder motor 46, but also inserts the stop pin 115 into the throat between the plates 97 and 111 to catch any one of the cores 31 which might have been started over from the core feeder conveyor belts 79 at the time of de-energizing the core feeding apparatus.

*Glue applicator*

Figure 12:
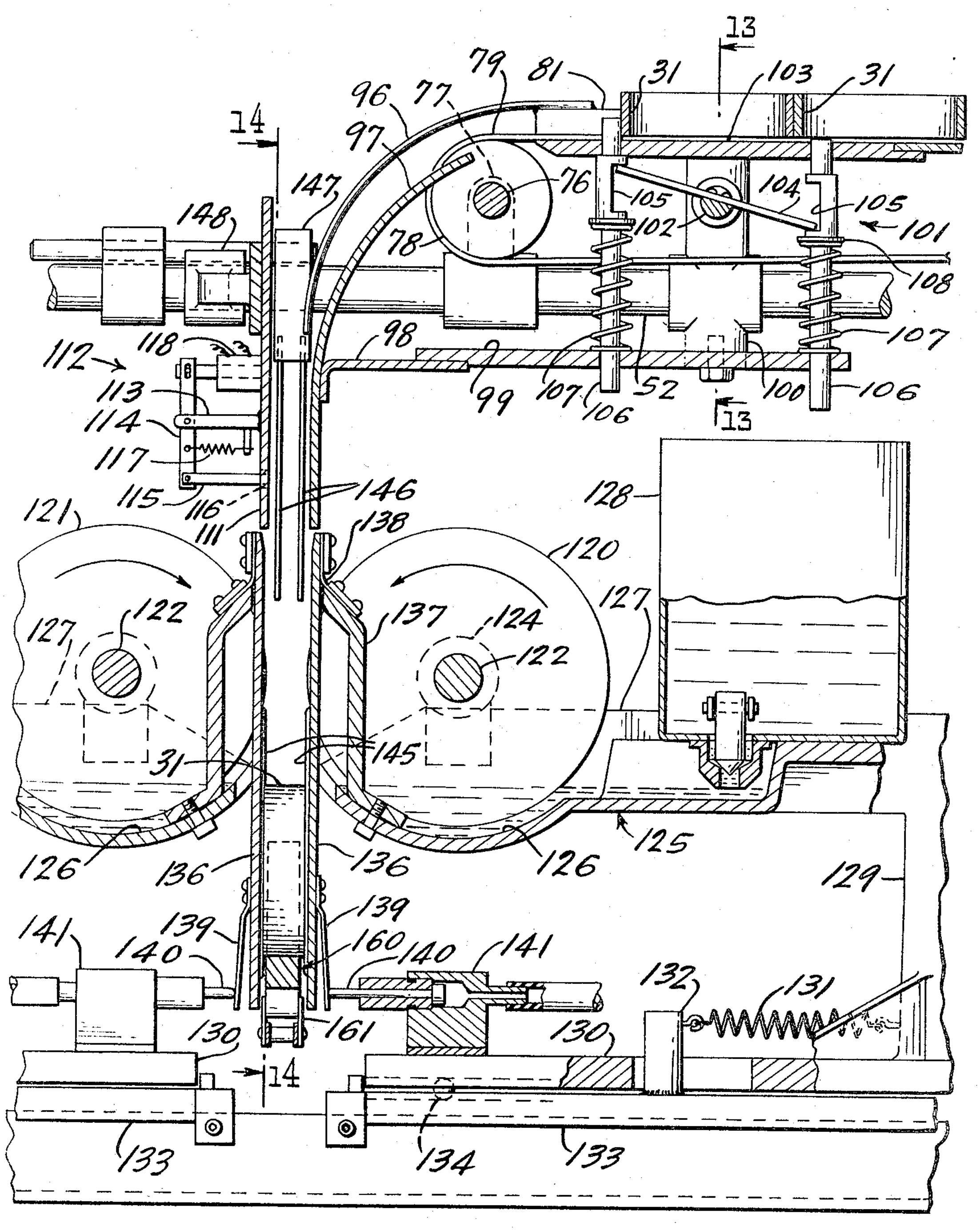
FIG. 12 is a fragmentary vertical sectional view taken along the line 12—12 of FIG. 1 and illustrating the core feeding mechanism and glue applying mechanism of an apparatus embodying the invention, being shown on a greatly enlarged scale relative to FIG. 1.

Apparatus embodying the invention comprises a glue applicator mechanism generally indicated by the reference 119 in FIG. 3 and shown in detail in FIGS. 12 and 14. The glue applicator 119 comprises a pair of glue applying rollers 120 and 121 which are mounted for rotation on parallel, spaced axes by shafts 122 (FIGS. 12 and 14). Each of the shafts 122 is journaled in a pair of aligned bearings 123 located on the upper ends of end brackets 124 of respective troughs 125. Each of the glue rollers 120 and 121 rotates in a pool of liquid adhesive maintained in its trough 125, the trough 125 consisting of an arcuate bottom 126 and end walls 127. Glue is supplied to the trough 125 from a metered glue supply tank 128. The trough 125 and tank 128 are supported by a pillar 129. The pillar 129 is mounted on a sliding baseplate 130. Each of the subassemblies consisting of one of the glue rollers 120 and 121 and its respective trough 125 and glue tank 128 is urged toward the space beneath the throat between the guide plates 97 and 111 (FIG. 12) by a spring 131 connected between the pillar 129 and a post 132 that is fixed on a baseplate 133. Each of the sliding plates 130 is supported on its respective baseplate 133 by a plurality of rollers 134.

Each of the glue rollers 120 and 121 consists of two axially spaced halves, leaving a space 135 (FIG. 14) therebetween. A pair of flexible guide extensions 136 extend vertically through the spaces 135 and downwardly therefrom in order to continue the guidance of the cores 31. Each of the guide extensions 136 is supported by a bracket 137 mounted at the front center of the respective trough 125 in the space 135. A spring leaf 138 supports the guide extension 136 on its respective bracket 137. A pressure finger 139 is connected to the outer side and at the lower end of each of the guide extensions 136 in line to be engaged by a plunger 140 of an air cylinder 141 which is mounted on the respective sliding plate 130. Admission of air into the cylinders 141 thrusts their plungers 140 against the pressure fingers 139 squeezing the guide extensions 136 inwardly toward each other and into contact with the ends of a core 31 therebetween in order to center the core on the respective core receiving element of the assembly conveyor which will be more fully described below.

The two glue rollers 120 and 121 are rotated in opposite directions with their adjacent surfaces both moving downwardly by means of a glue roller motor 142 (FIG. 3) which is coupled by worms 143, on a shaft extension **143*a* or similar parallel power shaft, to a pair of worm gears 144, one of which is secured on each of the glue roller shafts 122. The shaft extension 143*a* is provided with a "slip-joint" (not shown) so that the glue rollers 120 and 121 can be moved outwardly as will be described below. The glue roller motor 142** is controlled by a glue applicator switch S–2 (FIG. 26) and normally is left continuously operating during operation of the apparatus.

When a core 31 is released by the core release mechanism 101, it slides down the arcuate guide 97 and falls by gravity through the throat between that guide plate 97 and the vertical guide plate 111, downwardly into the space between the upper ends of the guide extensions 136 where its ends engage the glue bearing surfaces of the glue rollers 120 and 121. Rotation of the rollers 120 and 121 carries the core downwardly between the guide extensions 136. A core seating mechanism, to be described below, positively moves each core 31 downwardly between the guide extensions 136 into a core holding element of an assembly conveyor which passes through the space between the lower ends of the extensions 136 and will also be described below. In order to reduce frictional resistance to the passage of the cores 31 between the guide extensions 136 and to minimize the transfer of glue from the ends of the cores 31 to any of the mechanisms, each of the guide extensions 136 has a pair of vertically extending, laterally spaced guide strips 145 (FIG. 12) welded or otherwise affixed to its inner surface, and it is the guide strips 145 against which the cores 31 actually slide. Air is applied to the cylinders 141 by a cam actuated valve **145*a* timed from a main drive shaft 168 as will be described below. Air is applied just prior to the arrival of a core 31 at the bottom of the guide extensions 136 in order to center the core 31 therebetween and is removed immediately thereafter to allow the particular core 31 to be moved laterally out from between the guide extensions 136**.

Escape of the cores 31 from between the arcuate guide plate 97 and vertical guide plate 111 enroute to the guide extensions 136 is prevented by pairs of laterally spaced guide wires 146 (FIGS. 12 and 14) which extend downwardly from retainers 147 that are mounted on the support rods 52. The guide plate 111 is similarly supported by a bracket 148 which also is mounted on one of the support rods 52.

*Assembly conveyor*

After each of the cores 31 passes between the glue rollers 120 and 121 of the glue applicator, it is delivered into one of a series of saddles 160 which are carried by a chain 161 and constitute an assembly conveyor for the apparatus. The chain 161 is engaged with a drive sprocket 162 (FIG. 3) and an idler sprocket 163 and guided by the sprockets 162 and 163 in a direction transverse to the direction of movement of the core conveyor belts 79, the upper span of the chain 161 extending parallel to the axes of the glue rollers 120 and 121 and through the space beneath the lower ends of the guide extensions 136 (FIG. 12).

The drive sprocket 162 is mounted upon an output shaft 164 of a Geneva drive mechanism generally indicated by the reference number 165 in FIG. 3 and shown in detail in FIG. 5. The Geneva drive mechanism 165 comprises a Geneva gear 166 and a driver 167 which is mounted on a power shaft 168 that is driven by a speed reducer 169 powered by a main motor 170. The driver 167 has a raised peripheral cam surface 171 and a Geneva roller 172. As can best be seen by reference to FIG. 5, the rise of the cam surface 171 precedes the Geneva roller 172 angularly during the rotation of the driver 167. A bell crank 173 is mounted upon a pivot pin 174 supported by a bearing bracket 175. The bell crank 173 has two arms, the first of which carries a cam roller 176 which rides the periphery of the driver 167. The second arm of the bell crank 173 carries a positioning roller 177 which is engageable in each of a series of notches 178 cut in the periphery of the Geneva gear 166. The positioning roller 177 of the bell crank 173 is positively seated in each of the notches 178 by a spring 179 connected to the respective arm of the bell crank 173. Upon each rotation of the driver 167, the peripheral cam 171 first engages the cam roller 176 pivoting the bell crank 173 in a counterclockwise direction (FIG. 5) and disengaging the positioning roller 177 from that one of the notches 178 with which it was engaged. Immediately thereafter the Geneva roller 172 enters the respective one of the radial slots in the Geneva gear 166 to produce an angular increment of movement of the Geneva gear 166 and an increment of linear movement of the conveyor chain 161 equal to the center line distances between the saddles 160.

The positive seating of the positioning roller 177 in the notches 178 of the Geneva gear 166 assures the stopping of the assembly conveyor chain 161 with each of its saddles precisely centered to receive a core 31 from the glue applicator 119 and, more importantly, assures the positive position of each saddle 160 at a subsequent location where the head discs 32 are placed on the ends of the cores 31 to form the finished spool 30. Because the Geneva mechanism 165 positively drives the assembly conveyor chain 161 in only one direction, the positioning roller 177 not only fixes the stop position from the standpoint of forward movement of the chain 161 but also prevents inadvertent reverse movement which would throw the core carrying saddle 160 out of phase or position relative to the head assembly mechanism of the apparatus.

Each of the saddles 160 comprises a crescent shaped support 180 (FIG. 14) and a flexible retainer 181 and is attached to the assembly conveyor chain 161 by a T-link 182. The upwardly turned end of the crescent shaped support 180 and the upper free end of the retainer 181 are horizontally spaced from each other a distance such that a core 31 will be frictionally retained therebetween, and the upper end of the retainer 181 is curved inwardly slightly so as to positively retain a core 31 in the saddle 160.

*Core seating mechanism*

In order to seat each core 31 in its respective saddle 160, the apparatus has a core seating mechanism, generally indicated by the reference number 183, and shown in detail in FIGS. 14 and 14*a*. The core seating mechanism 183 is supported by a two-armed bracket 184 erected from the main frame of the apparatus. Bearing bosses 185 at the ends of the arms of the brackets 184 rotatably mount shafts 186 upon each of which a sprocket 187 and an arm 188 or 189 is mounted. A drive chain 190 is engaged with the sprockets 187 and with a sprocket 191 (FIG. 3) on a control shaft 192 which is driven by a chain 193 from the power shaft 168. The actuating link 110 of the core release mechanism 101 (FIGS. 12 and 13) vertically reciprocated by a crank (not shown) that is mounted on an extension of the control shaft 192 and the cam of the valve 145*a* of the core centering cylinders 141 (FIG. 12) is also mounted on the control shaft 192.

Rollers 194 mounted in the ends of the arms 188 and 189 are engaged in slots 195 and 196, respectively, in a bar 197. The bar 197 mounts a guide roller 198 which is engageable with a vertical guide plate 199 attached to the side of the bracket 184. A pusher arm 200 is pivotally connected at the end of the bar 197 and extends between the glue rollers 120 and 121 and between the guide extensions 136 when in the forward position illustrated in FIG. 14. A spring 201 is connected between the front end of the bar 197 and the end of the pusher arm 200 tending to hold the two in alignment. A normally closed microswitch 202 is mounted atop the bar 197 with its actuator 203 against the arm 200. An arcuate shoe 204 is mounted at the end of the arm 200, having a curvature substantially the same as that of the outer surface of the cores 31 and functioning as the force delivering element for shifting the cores 31 downwardly out of the space between the glue rollers 120 and 121 and through the guide extensions 136 into the saddles 160.

During normal operation of the core seating mechanism 183, each cycle begins by rotation of the sprockets 187 in the direction indicated by the arrows. Because the arm 189 is vertical in its stop position, the first increment of movement applied to the bar 197 thereby is upwardly and backwardly relative to the glue rollers 120 and 121. At the same time, because the arm 188 has not quite reached vertical position, the first increment of rotative movement lowers the rear end of the bar 197 contributing to tilting the bar 197 in a counterclockwise direction as viewed in FIG. 14. This initial tilting movement of the bar 197 takes place before the roller 194 engages the rear end of its slot 195 and raises the end of the arm 200 to lift the shoe 204 sufficiently so that retractive movement of the bar 197 which follows immediately can be made without the shoe 204 striking that one of the cores 31 which it has just previously seated in its respective saddle 160. As the bar 197 moves rearwardly and upwardly, it maintains its generally horizontal attitude because of the general parallelism of the arms 188 and 189. After the arms 188 and 189 have been rotated slightly less than 180° in a clockwise direction, the guide roller 198 engages the guide plate 199 near its upper end and, during the remaining rotation of the arms 188 and 189, the bar 197 and its arm 200 are translated downwardly in a straight path determined by the guide plate 199. Contact of the bar 197 with the roller 194 on the arm 189 and contact of the guide roller 198 with the guide plate 199 is maintained by a coil spring 205 engaged between the pins on which the rollers 194 and 198 are rotatably mounted.

The height to which the bar 197 and its arm 200 are raised during the first half rotation of the arms 188 and 189 is such that it is located above the level at which the uppermost portion of a core 31 is positioned when the core 31 falls by gravity downwardly into the space between the guide extensions 136 and engages the glue applicator rollers 120 and 121. As the bar 197 and arm 200 move downwardly in a straight line path controlled by the guide plate 199, the shoe 204 first engages the upper surface of the particular core 31 and then moves it downwardly to seat it in the saddle 160 as earlier described.

In the event that through some misfunction of the core release mechanism 101 two cores have been allowed to pass downwardly into the throat between the guide plates 97 and 111, so that two cores are following each other through the space between the glue applicator rollers 120 and 121, the shoe 204 engages the upper surface of the second such core, indicated by the reference number 31*a* and shown in dotted lines in FIG. 14. In this event, when the bar 197 and arm 200 move downwardly, the lower core 31 is seated in the saddle 160 and the following core 31*a* presents sufficient resistance to the movement of the arm 200 downwardly to overcome the tension of the spring 201 and "break" the bar 197 and arm 200, swinging the arm 200 into the dotted line position indicated in FIG. 14 and actuating the microswitch 202 to open the circuit controlled thereby. Ordinarily, of course, the resistance to movement of a core 31 between the guide extensions 136 is insufficient to overcome the spring 201.

The microswitch 202 is in the main power circuit for the assembly conveyor and thus, when opened, disconnects the assembly conveyor motor 170 from power. As indicated at the upper portion of FIG. 26, the microswitch 202 is in series from power line $L_1$ to power line $L_2$ through a stop switch 206, a start switch 207, and the coil of a relay R–1. Closing the start switch 207 energizes the relay R–1 to close its normally open contacts R–1*a* to establish a holding circuit through the microswitch 202 to retain the relay R–1 in closed position. Energizing the coil of the relay R–1 also closes its contacts R–1*b* and R–1*c* to apply power to the motor 170. Thus, when two cores 31 and 31*a* (FIG. 14) follow each other through the glue applicator mechanism 119, and the arm 200 of the core seating mechanism 183 "breaks," to open the microswitch 202, power is immediately removed from the motor 170 and the assembly conveyor chain 161 and associated mechanism are brought to an abrupt stop. This mechanism may also be stopped, of course, by the operator who merely pushes the stop switch 206 to break the same circuit and de-energize the motor 170.

After each successive core 31 is firmly seated in its respective saddle 160, as explained above, the Geneva mechanism 165 engages and the driving ratio and timing relative to the core seating mechanism 183 and core release mechanism 101 is such that the assembly conveyor chain 161 is moved one step forward to bring the next saddle 160 into alignment beneath the glue applicator mechanism 119 for the receipt of the next core 31. As the cores 31 continue to be emplaced in the saddles 160 on the assembly conveyor 161, the conveyor 161 moves the saddles 160 with their seated cores 31 through a heater chamber 208 (FIGS. 1 and 3) which partially "sets up" or dries the glue on the edges of the cores 31 to put it into a tacky condition for the assembly therewith of the head discs 32 in the next operation of the apparatus. The glue drying heater chamber 208 (FIG. 26) is connected between the power lines $L_1$ and $L_2$ by a heater switch "S–3" which the operator closes prior to the commencement of a spool forming operation.

*Header mechanism*

The assembly conveyor chain 161 leads from the glue applicator mechanism 119 to a header station which comprises a pair of similar but oppositely arranged header mechanisms, each generally indicated by the reference number 220, and shown in detail in FIGS. 15–22, inclusive. Each of the header mechanisms 220 has two adjacent head disc magazines 221 (FIGS. 15 and 16), each of which comprises a flanged cup 222 and four vertical guide rods 223 extending upwardly from the rim of the cup 222. A supply of head discs 32 is stacked in each of the magazines 221 with the printed faces of the head discs 32 turned upwardly. The two magazines 221 of each header mechanism 220 are simultaneously actuated by the head disc selector apparatuses of the header mechanism 220. The cups 222 of each magazine 221 rest in a pair of adjacent tubular sockets 224 which are part of a main casting 225. The tubullar sockets 224 are spaced from each other by a portion of the casting 225 which forms a central rib 226 (FIGS. 16, 17 and 18). An elevated land 227 extends forwardly from the rib 226 in alignment therewith along the top of a center extension 228 of the casting 225 which, with spaced end extensions 229 forms a pair of generally semicircular recesses 230 in the main casting 225. The underside of the casting 225 is milled away to form a pair of parallel channels (indicated by the arrow in FIG. 18), the lateral margins being indicated by the broken lines in FIG. 15. The two sockets 224 open downwardly into the channels 231, the open bottom of the sockets 224 having the same diameter as the width of the channels 231 which are also of the same width as the space between the inner sides of the center extension 228 and end extensions 229 of the casting 225.

A head disc slide 232 is slidable in each of the channels 231. The slide 232 has a pair of concentric grooves 233 and 234 (FIG. 18) cut in its upper surface. The diameters of the grooves 233 and 234 are somewhat smaller than the outside diameter of the head discs 32. The grooves 233 and 234 are in communication with each other and are connected by a nipple 235 to a source of vacuum so as to function as head disc holding means when the head disc slide 232 moves in the channel 231. A circular flat 236 is located at the center of the annular groove 234. The top of the flat 236 lies in the same plane as the top surface of the slide 232 as a whole. The application of vacuum to the nipple 235 thus applies vacuum to the annular grooves 233 and 234 to hold the lowermost one of the head discs 32 over the flat 236. A generally centrally located opening 237 is cut through the body of the slide 232 at the flat 236, extending from just back of the edge of the center hole 33 of the disc 32 forwardly to near the edge of the annular groove 234 and having a width slightly greater than the diameter of the central holes 33 of the head discs 32. The elongation of the opening 237 toward the front of the slide 232 is provided in order to enable the entry of a centering member into the center hole 33 of the lowermost head disc 32 and the removal of the head disc 32 from the slide 232 at a later point in the operation.

The channel 231 milled in the under surface of the main casting 225 has a depth equal to the thickness of the slide 232 from the center of the sockets 224 backwardly, i.e., from the plane along which the lines 16—16 of FIGS. 15 and 18 extend. From this central plane of the sockets 224 forwardly, i.e., toward the right side of FIG. 18, for example, the channel 231 is milled more deeply into the underside of the main casting 225 so that its depth is greater than the slide 232 by an amount slightly more than the thickness of one of the head discs 32 and less than the thickness of two superposed head discs 32. Similarly, the lower end of the cup 222 is also milled away forwardly from the transverse plane indicated by the reference lines 16—16 to form a semi-annular recess 238. When the cup is in the respective socket 224 the semi-annular recess 238 aligns with the portion of the channel 231 of greater depth to form a throat, indicated in FIG. 18 by the reference number 238.

With vacuum in the annular grooves 233 and 234 the lowermost head disc 32 is held down around and over the flat 236. When the slide 232 is moved forwardly the leading edge of that particular head disc 32 lies in a plane adjacent the top surface of the slide 232 so it passes through the recess 238 and through the throat 239. The next higher head disc 32 engages the inner, front, semi-circular wall of the cup 222 and is retained in the cup 222 by such engagement. As can best be seen in FIG. 18, the axial length of the cup 222 and the socket 224 are the same throughout the back 180° of their circumferences so that the cup 222 is supported in the socket 224 to leave the throat 239 open.

The throat 239 is preferably vertically wider at its outer ends than its center portion. This construction provides clearance for a head disc 32 which has a rough edge or burr, a condition which sometimes occurs when cardboard has been die-cut.

The slide 232 is movable from the position shown in solid lines in FIG. 18 to a forward position (indicated by the dotted lines in FIG. 18) in which the lowermost head disc 32 is carried into the space defined by the semicircular recess 230 in the main casting 225, with vacuum continuing to be placed in the annular grooves 233 and 234 beneath the head disc 32 in order to hold it on the slide 232. Two small air holes 240 (see also FIG. 15) are drilled through the slide 232 along its center line and are spaced backwardly from the circular groove 233 a distance such that when the slide 232 is in its forward position (dotted lines in FIG. 18), the two air holes 240 are beneath the remaining stack of head discs 32. During the movement of the slide 232 toward its forward position, the first of the two air holes 240 comes beneath the stack of head discs 32 very shortly after the lowermost head disc 32 has been completely removed from the cup 222. Air is supplied to the air holes 240 by a branched air line 241 (FIGS. 18 and 19) and the air can be left on the line 241 at all times because when the slide 232 is in the rear position (FIG. 19) the escape of air from the holes 240 has no detrimental effect. By delivering a small supply of air through the air holes 240 beneath the stack of head discs 32, the air cushion is provided which prevents scuffing or friction between the under surface of the lowermost head disc 32 and the main top surface of the slide 232 as that surface moves beneath the now lowermost head disc 32 while delivering the previously lowermost head disc 32 to the forward position from which it can be picked up for assembly with a core 31.

Each of the slides 232 has a downwardly extending ear 242 which is pivotally connected by a yoke 243 to the upper end of an oscillating lever 244 (FIG. 19) by which the slide 232 is reciprocated back and forth. The lever 244 is fixed on a shaft 245 that is oscillated by the engagement of a pinion 246 on the shaft 245 with a larger gear 247. The gear 247 is fixed on a header mechanism drive shaft 248 that is driven from the main power mechanism through clutch means to be described below. FIG. 19 shows the slide 232 and its associated parts in the rearmost position and FIG. 20 shows these parts in the forward position. The forward stroke of the disc slide 232 is limited by an adjustable stop pin 249 carried by a bracket 250 mounted at the rear end of the slide 232 and engageable (FIG. 20) with the rear side of the outer surface of the socket 224 for the particular slide 232.

When the slide 232 is at its foremost position, as illustrated particularly in FIG. 20, that one of the head discs 32 which has been selected from the respective head disc magazine is in position to be picked up for transfer to and assembly with that one of the cores 31 positioned at the header mechanism. It must be remembered, of course, that two such head discs 32 are delivered by the adjacent slides 232 at each side of the path of the movement of the saddles 160 which bring the cores 31 into assembly position.

The mechanism for picking up and applying two head discs 32 to the ends of the pair of cores 31 includes a pair of laterally adjacent vacuum heads 251 (FIGS 15, 17, 18 and 21) which are mounted for horizontal reciprocation by a guide bar 252 and a sliding foot 253. The foot 253 is connected by a pull rod 254 (FIG. 17), a yoke 255 (FIG. 19), to a rocking lever 256 which is mounted upon the header mechanism shaft 248. The guide bar 252 (FIGS. 16 and 17) slides on a support bar 257 that is secured in the bottom of a way milled in the top of the rib 226. A cap plate 258 is screwed to the top of the rib 226 to form the top of the way in which the guide bar 252 slides. The pull rod 254 slides in a horizontal bore extending longitudinally through the rib 226 parallel to and beneath the support bar 257 (FIG. 17). The foot 253 slides on the land 227 on the top of the center extension 228. Arcuate recesses 259 (FIGS. 15 and 16) are milled in the edges of the cap plate 258 concentrically with the sockets 224 and cups 222 so that the cups 222 can be lifted vertically out of the sockets 224 even though the cap plate 258 is in place. As can best be seen in FIG. 15, the flanges on the inner sides of the cups 222 are also cut away to form spaced, parallel sides defining the outer walls of the recesses 259.

Each of the two vacuum heads 251 (FIG. 18) comprises a support plate 260 that is fitted on the forward end of a stem 261 and a contact plate 262 which is secured on the front face of the support plate 260. The stem 261 slides in a sleeve 263 integrally constructed at the upper end of an arm 264 (see also FIG. 21). The two arms 264 are keyed or otherwise secured on the opposite ends of a pivot pin 265 mounted in a horizontal cross bushing 266 (see also FIG. 17) welded or otherwise secured to the front end of the guide bar 252.

The pivot pin 265 has a central passageway 267 connected to a branch of a vacuum line 268 and communicating with a passageway 269 in each of the arms 264. The passageway 269 leads through the wall of the sleeve 263 and cooperates with an annular groove 270 (FIG. 18) in the surface of the stem 261 to control the application of vacuum to the vacuum head 251. The stem 261 has a center vacuum passageway 271 that communicates with outwardly directed passageways 272 drilled through the contact plate 262 and opening in an annular recess 273 formed in the front face of the contact plate 262. The contact plate 262 also has a center point 274 of such size as to enter and snugly fit the center hole 33 of a head disc 32, one of which is shown in position in FIG. 18 by dotted lines. Vacuum thus is applied to the annular recess 273 of the vacuum head 251 to pick up and retain a head disc 32 during its transfer from its position on the top of the slide 232 at forward position, to assemble with that one of the cores 31 located in the header mechanism at that time.

Each of the stems 261 and its associated vacuum head 251 slides horizontally in its respective sleeve 263, the two stems 261 being connected to each other by a cross plate 275 (see also FIG. 15) attached to its rear end. The cross plate 275 is also screwed to a short cylindrical plunger 276 (FIG. 17) that is mounted for movement into and out of a cup 277, located between and with its axis parallel to the axes of the sleeves 263. The cup 277 is supported by a plate 278 (see FIG. 21) on a horizontal pin 279 extending between a pair of rocking levers 280. The rocking levers 280 are connected to each other at their upper ends by the pin 279 and are mounted on and keyed to the pivot pin 265 to swing with the pivot pin 265 and the arms 264. Each of the rocking levers 280 is pivotally connected at its lower end by a pivot pin 281 to one of a pair of forwardly extending links 282 which are pivotally mounted on opposite sides of the sliding foot 253 by a cross pin 283. The cup 277 is connected to a source of vacuum by a branch of the vacuum line 268 (FIG. 17) so that when vacuum is applied to the cup 277 to pull the plunger 276 into the cup 277 and thrust the vacuum heads 251 forwardly, vacuum is applied to the passageways 269 in the arms 264. When the vacuum heads 251 are moved forwardly, the annular grooves 270 are placed in communication with the passageways 269 and vacuum is applied to the annular recess 273 in the contact plate 262 of the vacuum heads 251.

The two vacuum heads 251 are urged toward their "assembly position" (FIGS. 15, 17, 18 and 19) by a spring 284 (FIGS. 17 and 21) which is hooked around one of the arms 264, wrapped around the bushing 266 and engaged with an upright 285 on the front of the guide 252. The spring 284 urges the cross pin 279 (FIG. 17) into contact with an adjustable stop 286 at the upper end of the upright 285 by which the precise "assembly position" may be adjusted. When the lever 256 is swung backwardly (counterclockwise FIG. 19), it pulls on the pull rod 254. Because the spring 284 holds the vacuum heads 251 in their upright position, rearward movement of the pull rod 254 (left in FIG. 19), moves the guide bar 252 and the vacuum head frame to the rear. Rearward movement of the mechanism continues until the upright 285 (FIG. 17) engages an adjustable stop 287 on the front end of the stationary cap plate 258. Continued rearward movement of the pull rod 254 pivots the rocking levers 280 (clockwise FIG. 17) on the pivot pin 265 swinging the arms 264 and overcoming the spring 284 to swing the vacuum heads 251 downwardly into concentric position above the two head discs 32 in the two slides 232. The driving relationship between the shaft 248 and the shaft 245, through the gear 247 and pinion 246 is such that the vacuum heads 251 arrive above the head discs 32 on the slides 232 just after the slides 232 have reached their most forward position, which is indicated in dotted lines in FIG. 18. The lengths of the related parts and the distances of movement are such that when the vacuum heads 251 swing to the downwardly pointing positions, as illustrated in FIG. 20, the point 274 of each is aligned with and above the center hole 33 in the head disc 32 that is located beneath it at the forward position of the respective slide 232.

Vacuum on the line 235 (FIG. 18) which leads to the annular grooves 233 and 234 in the slide 232 is controlled in timed relation to the actuation of the slide 232 so that when it reaches its foremost position with a head disc 32 on the top surface of the slide 232, vacuum on the underside of the head disc 32 is relieved. At the same time the vacuum head 251 has been moved backwardly and swung downwardly so that it is aligned above the head disc 32. At this time vacuum is applied to the vacuum line 268 which draws the plunger 276 into the cup 277 and extends the stems 261 moving the vacuum heads 251 downwardly to position the rim of the contact plate 262 just above the head disc 32 in the slide 232. Movement of the stems 261 to their extended positions establishes vacuum communication to the annular recesses 273 in the vacuum heads 251 which lifts the two head discs 32 up from their positions on the slides 232 and into contact with the contact plates 262 of the vacuum heads 251. The application of vacuum to the vacuum lines 235 and 268 is controlled by a pair of cam actuated vacuum switches MS–6 and MS–7 (see FIG. 26) which are located adjacent a half-speed cam shaft 288 (FIG. 3) driven from the control shaft 192. The switches MS–6 and MS–7 are in parallel circuits controlling solenoid valves 289 and 289*a*, respectively, for the pick-up vacuum line 268 to the pick-up heads 251 and the hold down vacuum line 235 to the slide 232. The vacuum lines are controlled by a main vacuum switch S–4 which supplies power to a motor operated vacuum pump and to the solenoid valves 289 and 289*a*.

As can best be seen by reference to FIG. 20, when the slide 232 is in its forward position and the vacuum heads 251 are in their downward positions to pick up the head discs 32, the two levers 244 (which move the slide 232) and 256 (which actuates the rocking mechanism for the vacuum heads 251) are in their most separated relationship. The two levers 244 and 256 are simultaneously swung away from each other by reason of the meshing of their respective gear 247 and pinion 246 and then swung toward each other, i.e., moved from the position indicated in FIG. 20 to that indicated in FIG. 19 to effect the return of the slide 232 to position beneath the head disc magazine 221 and to swing the vacuum heads 51 into their upper position where they press the head discs 32 against the cores 31. When the pull rod 254 is slid forwardly (left to right, in moving from FIG. 20 to FIG. 19 or FIG. 17), the first increments of forward movement allow the biasing spring 284 to swing the vacuum heads 251 upwardly in a counterclockwise direction (FIG. 20) and the point 274 swings through and out of the oval elongated opening 237 (FIG. 18) in the slide 232 without engagement therebetween.

Vacuum is maintained on the line 268 during the movement of the vacuum heads 251 from the position of FIG. 20 to the position of FIG. 19 and vacuum is relieved on the line 235 during the movement of the slide 232 from the position of FIG. 20 back to the position of FIG. 19. The vacuum heads 251 are swung upwardly in a counterclockwise direction until the links 282 and arms 264 are restored in the upright position and the pin 279 (FIG. 17) engages the adjustable stop 286 located at the upper end of the uprights 285.

It will be observed in FIG. 17 that no head disc 32 is shown in place on the vacuum head 251 whereas in FIG. 18 a head disc 32 is indicated in dotted lines. In both FIGS. 17 and 18, however, the vacuum heads 251 are illustrated in retracted position, i.e., with the vacuum off the cup 277 and the plunger 276 back so that the stems 261 are not extended. This position is one which immediately follows the delivery of the head discs 32 against the respective one of the cores 31 so that in the illustrated position, no head discs 32 would be in place on the vacuum heads 251.

When the vacuum heads 251 are initially swung upwardly to the positions indicated in FIGS. 17, 18 and 19 at the end of a placing stroke, because vacuum continues to be present in the line 268, the plunger 276 remains pulled in the cup 277 and the stems 261 and vacuum heads 251 are held thrust forwardly. The last increments of forward movement of the vacuum heads 251 pushes the two head discs 32 against the ends of the two cores 31 which are in position to receive them. At this point in the cycle, vacuum in the line 268 is cut off so that continued movement of the vacuum heads 251 against the opposed pressure of the vacuum heads on the opposite side of the cores 31 causes the stems 261 and the vacuum heads 251 to retract. Retraction of the stems 261 cuts off the vacuum to the recesses 273 on the front of the vacuum heads 251 to release the head discs 32. Because the adhesive on the edges of the cores 31 has been partially dried by passage through the heater chamber 208, as described above, the adhesive holds the head discs 32 on the opposed ends of the cores 31 completing the two ribbon spools 30. The interrelationship of the driving mechanisms is such that the assembly conveyor chain 161 remains stationary, holding the saddles 160 stationary, during the movement of the vacuum heads 251 by which the head discs 32 are placed on the cores 31 and for a period thereafter during which the opposed pressures of the vacuum heads 251 cause their retraction.

*Header mechanism drive*

The header mechanism drive shaft 248 and auxiliary shaft 245 are oscillated in timed relationship to the actuation of the Geneva drive mechanism 165 and the progression of the assembly conveyor chain 161 with its saddles 160. A helical drive pinion 290 (FIG. 3) is mounted on the main power shaft 168 and meshed with a helical gear 291 that is secured on the end of a crankshaft 292. A double throw crank 293 comprising a pair of spaced discs 294 is rotated by the crankshaft 292. The crank 293 is connected by oppositely extending crank arms 295 to a pair of rockers 296, one of which is shown in FIG. 3 and in an enlarged sectional view in FIG. 4. Each of the rockers 296 is pivotally mounted on a respective one of the two header mechanism drive shafts 248 for its respective one of the header mechanisms 220. Rotation of the crank 93 causes angular rocking of the rockers 296 and this rocking motion may be delivered to the respective one of the shafts 248 when a clutch, generally indicated by the reference number 297, is engaged. Each of the clutches 297 comprises an arm 298 which is rigidly secured to the respective shaft 248 for movement therewith. In ordinary cycling of the machine, each of the rockers 296 is drivingly engaged through its arm 298 with its shaft 248 by means of a heavy pin 299 which is urged by a compression spring 300 forwardly from a boss 301 at the end of the arm 298 into engagement with a coned socket 302 in the respective rocker 296. When it is desired to disengage the drive to the header mechanism 220, air is applied through a line 303 to the interior of the boss 301 and acts against an enlarged piston 304 on the pin 299 to retract pin 299 from the socket 302 of the rocker 296. Each of the rockers 296 has a pair of oppositely extending quadrants 305 of an extent greater than the relative angular movement between the arm 298 and the rocker 296. If it is desired to re-engage the clutch 297 at a time when the pin 299 is not aligned with its socket 302, air may be relieved from the line 303, allowing the spring 300 to extend to press the pin 299 against the face of the respective quadrant 305 on which it slides and finally to snap into the coned socket 302.

*Header mechanism controls*

In the path of and above the saddles 160 (FIG. 22) there are mounted three microswitches identified as MS–2, MS–3, and MS–5 which function as detectors for preconditioning the header mechanism control circuit in response to the presence or absence of cores 31 in the two saddles indicated by the reference numbers 160*a* and 160*b* which are positioned just ahead of the header mechanisms 220 at any given cycle of movement of the machine. As has been explained above, the assembly conveyor chain 161 is actuated by the Geneva drive mechanism 165 for intermittent movements, each of which moves the saddles 160 a distance equal to the center-to-center distance between those saddles 160 on the chain 161. In that portion of the apparatus where the conveyor chain 161 and its saddles 160 approach the header mechanisms 220 and pass therebetween, the chain 161 is supported for movement in a constant horizontal plane by a heavy support plate 305, shown fragmentarily in FIG. 22. This assures the concentricity of the cores 31 in their respective saddles 160 with the head discs 32 to be applied thereto by the header mechanisms 220. The driving ratio between the Geneva mechanism 165 which moves the assembly conveyor chain 161 and the crank actuated header mechanism shafts 248 is such that the header mechanisms 220 are actuated to deliver head discs 32 only once for each two intermittent movements of the conveyor chain 161. This same relationship is the reason for the 2:1 gear ratio between the control shaft 192 and the cam shaft 288 already mentioned.

The microswitches MS–2 and MS–3 are both actuated by a single feeler 310 so positioned as to be engaged by a core 31 in the first one of the pair of saddles 160*a* and 160*b*, which are approaching the header mechanisms 220. The microswitch MS–5 is so positioned that its feeler 311 is actuated by a core 31 in the second saddle of the pair of saddles 160*a* and 160*b*. Unless both of these two saddles which are about to be moved into the space between the header mechanisms 220 are occupied by cores 31, the operation of the header mechanisms 220 normally is prevented in order to preclude the possibility that head discs 32 would be delivered to opposite sides of a saddle 160 that did not contain a core 31 and then would fall into the mechanism where they might cause a jam.

The microswitches MS–2, MS–3 and MS–5 are connected in a sub-circuit controlling the operation of the header mechanisms 220 and shown at about the center of the wiring diagram of FIG. 26. The header mechanisms 220 are majorly controlled by a head feeder control switch S–5 which the operator closes in order to first energize this entire sub-circuit. Two additional microswitches, identified as MS–1 and MS–4, are located adjacent the one-half speed cam shaft 288 and are opened and closed by suitably shaped cams on the shaft 288 to make and break circuits within the sub-circuit controlled by the header mechanism control switch S–5.

In considering the control circuit for the header mechanism it must be borne in mind that the two header mechanism clutches 297 are disengaged when the solenoid valve controlling the application of air to the lines 303 is open, i.e., to supply air to those lines, and the clutches 297 are engaged when the solenoid valve, identified as 312 in FIG. 26, is de-energized.

To start the operation of the header mechanism, the operator closes a header power switch S–5 to establish a circuit leading from the power line $L_2$ through the switch S–5, the contact PB–1*b* of a pushbutton switch, to a common junction of the microswitches MS–3 and MS–5 and of a manually actuated switch S–6, and from there through the microswitch MS–4 and the coil of a relay R–2 to the power line $L_1$. Assuming that the core feeding mechanism and main motor for the assembly conveyor have previously been started, cores have begun to be placed in the saddles 160 on the assembly conveyor 161 but may not yet have arrived at the positions of the saddles 160*a* and 160*b* of FIG. 22. In this event, no cores are present to open the microswitches MS–3 and MS–5 so that current can flow through either or both of these switches and the next time that the one-half speed cam shaft 288 rotates to close the microswitch MS–4, current flows through the circuit, energizing the coil of relay R–2 and closing its contacts R–2*a* and R–2*b*. Closure of the contact R–2*a* allows current to flow through the coil of a solenoid valve 312 and through a by-pass line 313 and the switch S–5 to the line $L_2$. Energizing the solenoid valve 312 admits air to the lines 303 disengaging the header mechanism drive clutches 297. Closing the relay contact R–2*b* establishes a holding circuit for the relay R–2 from the power line $L_1$ through the coil of the relay R–2, a branch line 314, the contact R–2*b*, a line 315, the contact PB–1*a* of the pushbutton, the microswitch MS–2 (which also is closed because there is no core present at the position occupied by the saddle 160*a*—FIG. 22), a line 316; the contacts PB–1*b* and the switch S–5 to the power line $L_2$.

When the cores 31 which have been fed into the saddles 160 finally reach the positions occupied by the saddles 160*a* and 160*b* in FIG. 22, all three of the microswitches MS–2, MS–3 and MS–5 are opened. This breaks both the initial circuit to the coil of the relay R–2 and the holding circuit just described, and may cause the relay R–2 to be de-energized and result in the de-energization of the solenoid valve 312 to allow the header mechanism drive clutches 297 to engage. However, the actuating cam on the one-half speed cam shaft 288 holds the microswitch MS–1 closed, maintaining a second holding circuit through the coil of the relay R–2, the line 314, the contact R–2*b*, the microswitch MS–1, and the by-pass line 313. As the cam shaft 288 revolves, it finally opens the microswitch MS–1 which drops the relay R–2 out of circuit and deenergizes the solenoid valve 312. This positively engages the clutches 297 for the header mechanism drive and the header mechanisms commence operation.

As long as there are cores 31 in the saddles 160 at the positions occupied by the saddles 160*a* and 160*b*, upon each second intermittent movement of the assembly conveyor chain 161, the microswitches MS–3, MS–5 and MS–2 will be held open by the presence of the cores 31 so that even though the microswitches MS–4 and MS–1 are closed during each revolution of the half speed cam shaft 288, the closure of the two microswitches MS–4 and MS–1 does not establish any circuits for energizing the coil of the relay R–2 and thus energizing the solenoid valve 312 to disengage the header mechanism drive clutches 297 and the apparatus continues to operate with the header mechanisms 220 cycling upon each second intermittent movement of the assembly conveyor chain 161.

If it is desired to feed the cores 31 in their saddles 160 past the header mechanisms 220 without energizing the header mechanisms 220, a header mechanism hold switch S–6 can be manually closed by the operator so that when the microswitch MS–4 is next closed by the half speed cam shaft 288, a circuit will be established to energize the coil of the relay R–2 and the solenoid valve 312 to disengage the header mechanism drive clutches 297. As long as the switch S–6 is held in closed position, the solenoid valve 312 remains energized and the clutches 297 remain disengaged.

In some instances, when the apparatus is initially started, there may be cores 31 in the saddles 160 and even at the positions occupied by the saddles 160*a* and 160*b* in FIG. 22. However, because of previous jams or testing operations which may have gotten the header mechanisms 220 out of phase with the conveyor chain 161, there may be no head discs 32 in place on the vacuum heads 251 to be assembled onto the cores 31 which will next reach the header mechanisms 220. In this case, the operator pushes the pushbutton switch, opening both of its contacts PB–1*a* and PB–1*b*. This breaks two of the circuits through which the coil of the relay R–2 can be energized so that the next time the microswitch MS–1 is opened by its cam on the one-half speed cam shaft 288, the coil of the relay R–2 drops out of circuit, de-energizing the solenoid valve 312 and allowing the clutches 297 to be engaged for cycling the header mechanisms. The operator immediately releases the pushbutton allowing its contacts PB–1*a* and PB–1*b* to reclose so that as the one-half speed cam shaft 288 rotates and the microswitch MS–4 is closed, the relay R–2 will be actuated. This energizes the solenoid valve 312 and again disengages the header mechanism drive clutches 297 until such time as cores 31 reach the positions of the saddles 160*a* and 160*b* in FIG. 22, which will open the microswitches MS–2, MS–3 and MS–5 to de-energize the solenoid valve 312 and cause the re-engagement of the driving clutches 297.

*Spool rejector*

Because both ends of the cores 31 are coated with adhesive, if the header mechanisms 220 fail to place head discs 32 on both sides of a core 31, to assemble a complete spool 30, the adhesive coated end or ends of the particular core 31 would come into contact with subsequent elements of the apparatus and the adhesive would be smeared on those elements. In order to preclude this happening, an apparatus embodying the invention is provided with an incomplete spool rejector, generally indicated by the reference number 320 (FIG. 22), which is positioned adjacent the end of the assembly conveyor chain 161. The incomplete spool rejector 320 comprises a housing 321 for a light source which also mounts a focusing tube 322 by which the light is directed across the path of movement of the completed spools 30 in the saddles 160. The focusing tube 322 (see also FIG. 1) is aimed diagonally across the path of movement of the spools 30 so that if two head discs 32 have been properly placed on the ends of a core 31, the central openings 33 in the head discs 32 will not be aligned along the path of the light beam from the focusing tube 322. The beam of light is wide enough, however, so that if only one of the head discs 32 has been placed on only one side of a core 31, sufficient light will pass through that single opening 33 in that head disc 32 to actuate a photocell control mechanism 323 (FIGS. 1 and 26) to cause the rejection of the incomplete spool 30. A bracket 324, which supports the housing 321, also mounts a sleeve 325 to pivotally support a rod 326. A rejection arm 327 is fixed on one end of the rod 326, the other end of the rod 326 carrying a crank 328 which is connected by a link 329 to the core rod of a solenoid 330.

The incomplete spool rejector 320 is electrically connected in circuit between the power lines $L_1$ and $L_2$ under the control of a main switch S–7 (FIG. 26). The circuitry includes a transformer 331, with the secondary coil thereof connected to a lamp 332 furnishing the light source for the device. A microswitch MS–9 momentarily energizes the lamp 332 in timed relationship to the movement of the assembly conveyor chain 161, the microswitch MS–9 being mounted adjacent the full speed control shaft 192 to flash the lamp 332 each time an individual saddle 160 moves across the beam of light from the focusing tube 322. An amplifier 333 of the photocell control mechanism is also connected between the power lines $L_1$ and $L_2$ through the main switch S–7 so as to amplify the impulse received by a photocell 334 to actuate the solenoid 330 whenever an incomplete spool 330 passes the light beam from the focusing tube 322. Whenever the solenoid 330 actuated, it swings the rejection arm 327 to kick the incomplete spool 30 out of its respective saddle 160 into a waste bin 335 positioned adjacent the apparatus (see FIG. 1).

*Drying conveyor*

An apparatus embodying the invention also has a drying conveyor generally indicated by the reference number 340 and illustrated in FIGS. 22–25, as well as being schematically shown in FIG. 1. The drying conveyor 340 comprises a pair of belts 341 having inner spans 342 which extend parallel to each other and lead away from the end of the assembly conveyor chain 161. The belts 341 are guided by suitable rollers 343 at their far ends, 344 intermediate their lengths, and 345 at their ends adjacent the chain 161. The inner spans 342 of the belts 341 are spaced laterally from each other such a distance as to engage the outer sides of the head discs 32 of completed spools 30 which are traveling therebetween in order to insure the firm adhesion of the head discs 32 to the cores 31. Pressure on the spools 30 is also insured by several pressure shoes 346 (see FIG. 25) which act on spaced, parallel backing plates 347 against which the belts 341 slide. Each of the shoes 346 comprises a pair of spaced, vertical uprights 348 and opposed resilient leaves 349 which are positioned between the inner surfaces of the uprights 348 and the outer surfaces of the backing plates 347 for urging the backing plates 347 and the belts 341 inwardly toward each other to sequeeze the head discs 32 onto the cores 31 as illustrated in FIG. 25.

After the saddles 160 pass the rejecting mechanism 320 (FIG. 22), the assembly conveyor chain 161 moves around its sprocket 163 and swings the saddles 160 downwardly. The two rollers 345 of the drying conveyor 340 are mounted on spindles 350 in bosses 351 that are carried by arms 352 of a pair of bell cranks 353. The bell cranks 353 are pivotally mounted on parallel pins 354 which are secured in sockets 355 that are in turn mounted on a portion 356 of the machine frame. The two bell cranks 353 also have opposed, laterally extending arms 357, each of which is connected by a link 358 to a rocker 359. The rockers 359 are rigidly mounted upon a cross shaft 360 extending beneath the belts 341 and on which there is also secured an arm 361 (FIG. 24) that is connected by a rod 362 to a plunger 363 of an air cylinder 364. Springs 365 are connected to the rockers 359, tending to swing the bell cranks 353 to the positions indicated by the dotted lines in FIG. 23, separating the two rollers 345 and opening an entrance, as it were, into the space between the inner spans 342 of the belts 341. By separating the rollers 345 from each other just prior to the arrival of a saddle 160 therebetween (FIG. 22), engagement between a finished spool 30 which is moving transversely to the direction of movement of the belts 341, with the belts 341 is precluded.

The belts 341 are driven by a motor 366 (FIG. 26) which is controlled by the main switch S–7 and which operates continuously so that the belts 341 continuously move, even when the air cylinder 364 is de-energized to allow the springs 365 to separate their spans at the entrance end of the conveyor belts 341. The air cylinder 364 is actuated in timed relationship to the intermittent movement of the assembly conveyor chain 161 by a microswitch MS–8 controlling a branch line 367 to a solenoid valve 368. The microswitch MS–8 is located adjacent the full speed control shaft 192 (FIG. 3) and actuated by a cam on that shaft to energize the solenoid valve 368 to allow the belts 341 to open upon each intermittent movement of the assembly conveyor chain 161 as the particular saddle 160 carrying a spool 30 approaches the space between the inner spans 342 of the belts 341. Immediately thereafter, the solenoid valve 368 is energized, supplying air to the cylinders 364 to close the belts 341 together grasping the particular spool 30 which is therebetween and the continuous movement of the belts 341 withdraws the particular spool 30 from the saddle 160 during the stationary period between intermittent movements of the assembly conveyor chain 161. It will be observed in FIG. 22 that at the time a saddle 160 is located between the spans of the belts 341, their direction of movement pulls the particular spool directly out of its saddle 160, flexing the retainer 181.

The length of the drying conveyor 340 is such that by the time each spool 30 reaches the discharge end of the conveyor 340, the adhesive retaining the head discs 32 on the cores 31 has thoroughly dried so that spools 30 may be discharged from between the end rollers 343 (FIG. 1) into a suitable receptacle such as a packing box 369.

What we claim is:

1. Apparatus for fabricating spools, each of which comprises a tubular core and a head disc adhered to each of the ends of said core, said apparatus comprising, in combination, a glue applicator having means for coating the ends of said cores with glue, core delivery mechanism for serially delivering said cores from a supply to said glue applicator, an assembly conveyor movable past said glue applicator and comprising a series of uniformly spaced, individual core holders, each of said core holders being of axial length less than the axial length of said cores, intermittent drive mechanism for repeatedly moving said assembly conveyor a distance equal to the distance between said core holders, header mechanisms on opposite sides of said assembly conveyor, each of said header mechanisms comprising a head disc magazine, each of the head disc magazines having means for positioning a stack of head discs therein and an open bottom, an individual head disc selector and a transfer head for successively moving individual selected head discs against the ends of successive cores in successive core holders, each of said individual head disc selectors comprising a slide forming a bottom for said magazine and reciprocal therebeneath, said slide having an open topped groove in its upper surface, that is in communication with a source of vacuum and that is beneath said magazine at one position of said slide, a transfer head mounted adjacent each of said magazines and above the path of movement of the respective one of said slides and movable between a position just above said slide and a position adjacent a core holder on said assembly conveyor, said transfer head being connected to a source of vacuum for lifting a head disc from the top surface of said slide and holding said head disc until after assembly on said core, and drive mechanism for said headers actuated in timed cycle to said intermittent drive mechanism.

2. Apparatus according to claim 1 wherein said transfer head is pivotally mounted on a reciprocal support for movement between a pick-up position just above the slide at the position occupied by said groove when said groove is not beneath said stack of head discs and an assembly position adjacent a core in one of said core holders, mechanism for reciprocating said support and pivoting said transfer head back and forth between said positions, control mechanism for applying vacuum to said transfer head when in said pick-up position for lifting a head disc from said slide, and means on said transfer head for centering each head disc relative thereto.

3. Apparatus according to claim 1 and core sensing means mounted adjacent said assembly conveyor at a position ahead of said header mechanisms for disabling said drive mechanism for said header mechanisms if no core is present in a core holder at said position.

4. Apparatus for fabricating spools, each of which comprises a tubular core and a head disc adhered to each of the ends of said core, said apparatus comprising, in combination, a glue applicator having means for coating the ends of said cores with glue, said glue applicator including a pair of rollers mounted on spaced, parallel horizontal axes and means for rotating said rollers with their near surfaces, at the nip therebetween, moving downwardly, core delivery mechanism for serially delivering said cores from a supply to said glue applicator, an endless flexible assembly conveyor movable past said glue applicator and having a series of uniformly spaced, individual core holders mounted thereon, each of said core holders being of axial length less than the axial length of said cores, said assembly conveyor being guided and driven by spaced rotary means for movement in a path parallel to the axes of said rollers beneath the nip between said glue applicator rollers, core seating mechanism for moving successive cores into said core holders, intermittent drive mechanism for repeatedly moving said assembly conveyor a distance equal to the distance between said core holders and actuating said core seating mechanism upon arrival of each core holder at a position adjacent thereto, header mechanisms on opposite sides of said assembly conveyor, each of said header mechanism comprising a head disc magazine, an individual head disc selector, a transfer head for successively moving individual selected head discs against the ends of successive cores in successive core holders, and drive mechanism for said header mechanisms actuated in timed cycle to said intermittent drive mechanism.

5. Apparatus according to claim 4 in which each of said rollers comprises two axially spaced halves defining a space therebetween, and which apparatus has longitudinal flexible guides extending tangentially through such spaces for defining a path of travel for such cores out from between said rollers.

6. Apparatus according to claim 4 in which said core seating mechanism comprises an arm movable downwardly through the nip between said glue applicator rollers for moving a core out of the nip and seating said core in one of said core holders beneath the nip.

7. Apparatus according to claim 6 in which said arm of said core seating mechanism comprises two articulated parts, said parts being relatively movable in reaction to a core not being movable through the nip between said glue applicator rollers and into a core holder therebeneath, and control means actuated by relative movement of said two parts for stopping said mechanism.

8. Apparatus according to claim 7 and a drying conveyor having a pair of belts, longitudinally spaced pairs of parallel rollers mounting said belts with their inner spans spcaed apart a distance such that assembled spools are snugly grasped therebetween, means mounting that pair of rollers at the entry end of said conveyor belts at a position adjacent to and on opposite sides of a part of the path of movement of said core holders on said assembly conveyor and for movement toward and away from each other, and mechanism timed from said intermittent drive mechanism for separating said rollers prior to arrival of a core holder at such adjacent position and for moving said rollers toward each other after arrival of said core holder for grasping an assembled spool and removing such spool from said core holder.

9. A header mechanism for an apparatus for the assembly of spools, each of said spools consisting of an open ended tubular core and two head discs of diameter greater than said core and adhered on the ends thereof, said apparatus comprising means for applying glue on the ends of said cores and conveyor means for serially presenting said cores at uniformly spaced times and at a heading position with the ends thereof exposed and lying in vertical planes, said header mechanism comprising, in combination, a vertical tubular magazine adapted to hold a stack of head discs, a selector slide forming a bottom for said magazine, said slide having a disc recess in its upper surface and being reciprocal between a first position with said recess at the bottom of said magazine and a second position with said recess removed from beneath said magazine, means for reciprocating said slide between said positions, a transfer head having a head disc contact face and means for centering a head disc thereon, means mounting said transfer head for movement between a pick-up position overlying the recess in said slide at the removed position thereof and an assembly position adjacent one end of a core in heading position, and drive mechanism actuated in timed relationship to the movement of said conveyor means for reciprocating said selector slide and transfer head between their positions for serially selecting individual head discs, moving said discs out of said magazine, picking up said discs and applying said discs to the ends of successive cores.

10. A header mechanism for an apparatus for the assembly of spools, each of said spools consisting of an open ended tubular core and two head discs of diameter greater than said core and adhered on the ends thereof, said apparatus comprising means for applying glue on the ends of said cores and conveyor means for serially presenting said cores at uniformly spaced times and at a heading position with the ends thereof exposed and lying in vertical planes, said header mechanism comprising, in combination, a vertical tubular magazine adapted to hold a stack of head discs, a selector slide forming a bottom for said magazine, said slide having head disc holding means on its upper surface and being reciprocal between a first position with said holding means at the bottom of said magazine and a second position with said holding means moved from beneath said magazine, means for reciprocating said slide between said positions, a transfer head having a head disc contact face and means for centering a head disc thereon, means mounting said transfer head for movement between a pick-up position overlying said holding means on said slide at the removed position thereof and an assembly position adjacent one end of a core in heading position, and drive mechanism actuated in timed relationship to the movement of said conveyor means for reciprocating said selector slide and transfer head between their positions for serially selecting individual head discs, moving said discs out of said magazine, picking up said discs and applying said discs to the ends of successive cores.

11. A header mechanism according to claim 9 in which the head disc holding means comprises at least one groove in the upper surface of said slide and means for applying vacuum in the groove in said slide when said slide is in first position and to the contact face of said transfer head when in pick-up and assembly positions and for releasing such vacuum from the contact face of said transfer head after application of a head disc to a core.

12. A header mechanism according to claim 9 and mechanism for moving said contact face of said transfer head horizontally for pressing a head disc carried thereby into contact with the end of a core.

References Cited by the Examiner

UNITED STATES PATENTS

| | | | |
|---|---|---|---|
| 2,682,207 | 6/1954 | Rynish | 93—1 |
| 2,776,224 | 1/1957 | Cote. | |
| 2,864,612 | 12/1958 | Dellinger et al. | 271—32 |
| 2,887,018 | 5/1959 | Berenson | 93—1 |
| 2,967,465 | 1/1961 | Berenson | 93—1 |

BERNARD STICKNEY, *Primary Examiner.*